US012694193B2

(12) United States Patent
Joshi et al.

(10) Patent No.: US 12,694,193 B2
(45) Date of Patent: Jul. 28, 2026

(54) APPLICATION NEGOTIABLE PLATFORM THERMAL AWARE SCHEDULER

(71) Applicant: Intel Corporation, Santa Clara, CA (US)

(72) Inventors: Prakaram Joshi, Gilbert, AZ (US); Deepti Aggarwal, Gilbert, AZ (US); Rajesh Poornachandran, Portland, OR (US); Michael Espig, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 17/532,877

(22) Filed: Nov. 22, 2021

(65) Prior Publication Data

US 2023/0161941 A1 May 25, 2023

(51) Int. Cl.
| | |
|---|---|
| *G06F 30/398* | (2020.01) |
| *G06F 9/48* | (2006.01) |
| *G06F 30/392* | (2020.01) |
| *G06F 119/02* | (2020.01) |
| *G06F 119/08* | (2020.01) |

(52) U.S. Cl.
CPC .......... *G06F 30/398* (2020.01); *G06F 9/4881* (2013.01); *G06F 30/392* (2020.01); *G06F 2119/02* (2020.01); *G06F 2119/08* (2020.01)

(58) Field of Classification Search
CPC .... G06F 30/398; G06F 9/4881; G06F 30/392; G06F 2119/02; G06F 2119/08; G06F 9/5094; Y02D 10/00
See application file for complete search history.

(56) References Cited

U.S. PATENT DOCUMENTS

| | | | | |
|---|---|---|---|---|
| 9,087,146 | B2 * | 7/2015 | Rusu | G06F 11/3024 |
| 9,886,326 | B2 * | 2/2018 | Paul | G06F 9/5094 |
| 2002/0073129 | A1 * | 6/2002 | Wang et al. | G06F 9/00 709/102 |
| 2007/0260895 | A1 * | 11/2007 | Aguilar, Jr. et al. | G06F 1/00 713/300 |
| 2010/0257533 | A1 * | 10/2010 | Dvir et al. | G06F 9/46 718/103 |

(Continued)

FOREIGN PATENT DOCUMENTS

| | | |
|---|---|---|
| WO | 2012170746 | 12/2012 |

OTHER PUBLICATIONS

International Search Report and Written Opinion from PCT/US2022/078660 notified Feb. 20, 2023, 11 pgs.

(Continued)

*Primary Examiner* — John E Breene
(74) *Attorney, Agent, or Firm* — Essential Patents Group, LLP

(57) ABSTRACT

An embodiment of an integrated circuit may comprise a management controller and circuitry communicatively coupled to the management controller, the circuitry to dynamically determine a performance measurement for each of two or more circuit blocks based at least in part on the physical design layout of the two or more circuit blocks, and report a schedule recommendation to an operating system scheduler based at least in part on the determined performance measurements. Other embodiments are disclosed and claimed.

15 Claims, 17 Drawing Sheets

(56) References Cited

U.S. PATENT DOCUMENTS

| | | | |
|---|---|---|---|
| 2012/0096293 A1* | 4/2012 | Floyd ................... | G06F 1/3287 |
| | | | 713/323 |
| 2014/0195996 A1* | 7/2014 | Bose .................... | G06F 30/392 |
| | | | 716/120 |
| 2014/0317389 A1 | 10/2014 | Wenisch et al. | |
| 2015/0178138 A1 | 6/2015 | Saha et al. | |
| 2018/0239641 A1* | 8/2018 | Kumar ................. | G06F 9/5044 |
| 2019/0004815 A1* | 1/2019 | Povalyayev et al. ........................ | |
| | | | G06F 9/3891 |
| 2019/0042280 A1* | 2/2019 | Shanbhogue ......... | G06F 1/3206 |
| 2021/0064426 A1* | 3/2021 | Gupta ....................... | G06F 1/10 |

OTHER PUBLICATIONS

International Preliminary Report on Patentability from PCT/US2022/078660 notified Jun. 6, 2024, 7 pgs.
Rybczynska, Marta, "Telling the scheduler about thermal pressure", <https://lwn.net/Articles/788380/> accessed Oct. 29, 2021, 4 pgs.
Extended European Search Report from European Patent Application No. 22896628.9 notified Sep. 23, 2025, 7 pgs.

* cited by examiner

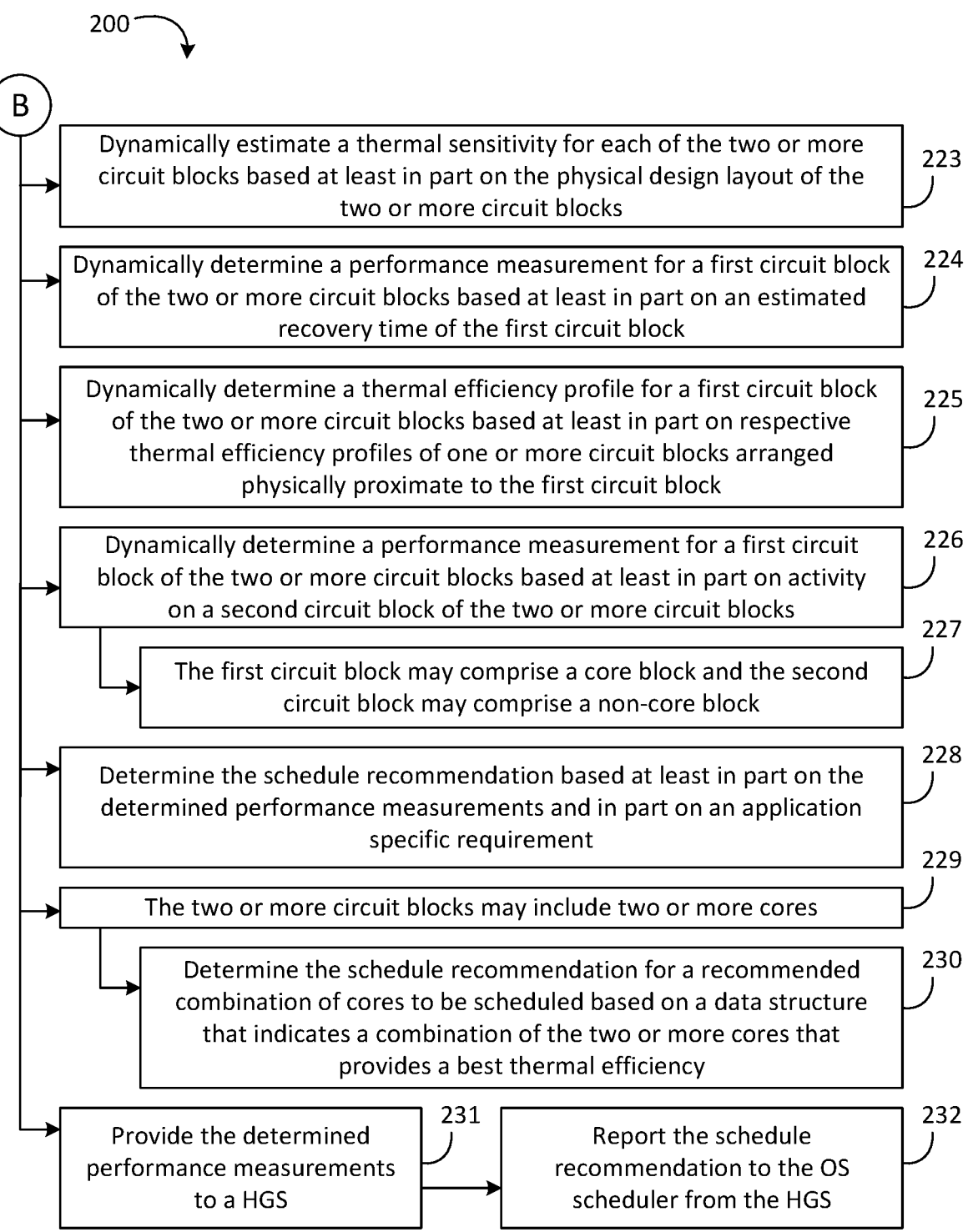

200

B

Dynamically estimate a thermal sensitivity for each of the two or more circuit blocks based at least in part on the physical design layout of the two or more circuit blocks — 223

Dynamically determine a performance measurement for a first circuit block of the two or more circuit blocks based at least in part on an estimated recovery time of the first circuit block — 224

Dynamically determine a thermal efficiency profile for a first circuit block of the two or more circuit blocks based at least in part on respective thermal efficiency profiles of one or more circuit blocks arranged physically proximate to the first circuit block — 225

Dynamically determine a performance measurement for a first circuit block of the two or more circuit blocks based at least in part on activity on a second circuit block of the two or more circuit blocks — 226

The first circuit block may comprise a core block and the second circuit block may comprise a non-core block — 227

Determine the schedule recommendation based at least in part on the determined performance measurements and in part on an application specific requirement — 228

The two or more circuit blocks may include two or more cores — 229

Determine the schedule recommendation for a recommended combination of cores to be scheduled based on a data structure that indicates a combination of the two or more cores that provides a best thermal efficiency — 230

Provide the determined performance measurements to a HGS — 231

Report the schedule recommendation to the OS scheduler from the HGS — 232

Sensor Location

700

HW_ANPTAS_MSR HANDLER

POLICY MANAGER (INTERACTS WITH PLATFORM BMC/TEE OOB FOR MANAGEABILITY)

ML BASED PREDICTIVE & ADAPTIVE AGENT

PLATFORM THERMAL SLA REQUIREMENT

MEASURED DYNAMIC THERMAL EFFICIENCIES ACROSS IP BLOCKS

760

| | CORE 0 | CORE 1 | CORE 2 | CORE 3 |
|---|---|---|---|---|
| 1 ACTIVE CORE | /// | | /// | /// |
| 2 ACTIVE CORE | /// | | | /// |
| 3 ACTIVE CORE | | /// | | |
| 4 ACTIVE CORE | | | | |

| CORES SCHEDULED | # ACTIVE CORES | | |
|---|---|---|---|
| | 1 | 2 | 3 |
| 0 | 30.61 | | |
| 1 | 32.76 8.15% | | |
| 2 | 30.39 | | |
| 3 | 30.30 | | |
| 0,1 | | 28.26 | |
| 0,2 | | 27.97 | |
| 0,3 | | 27.92 | |
| 1,2 | | 28.41 1.8% | |
| 1,3 | | 27.89 | |
| 2,3 | | 27.91 | |
| 0,1,2 | | | 24.64 |
| 0,1,3 | | | 24.75 |
| 0,2,3 | | | 24.82 2.72% |
| 1,2,3 | | | 24.16 |

FIG. 9B

PROCESSOR 1100

1200

1215

PROCESSOR 1210

1295

CONTROLLER HUB 1220

CO-PROCESSOR
1245

GMCH
1290

MEMORY
1240

I/O
1260

IOH
1250

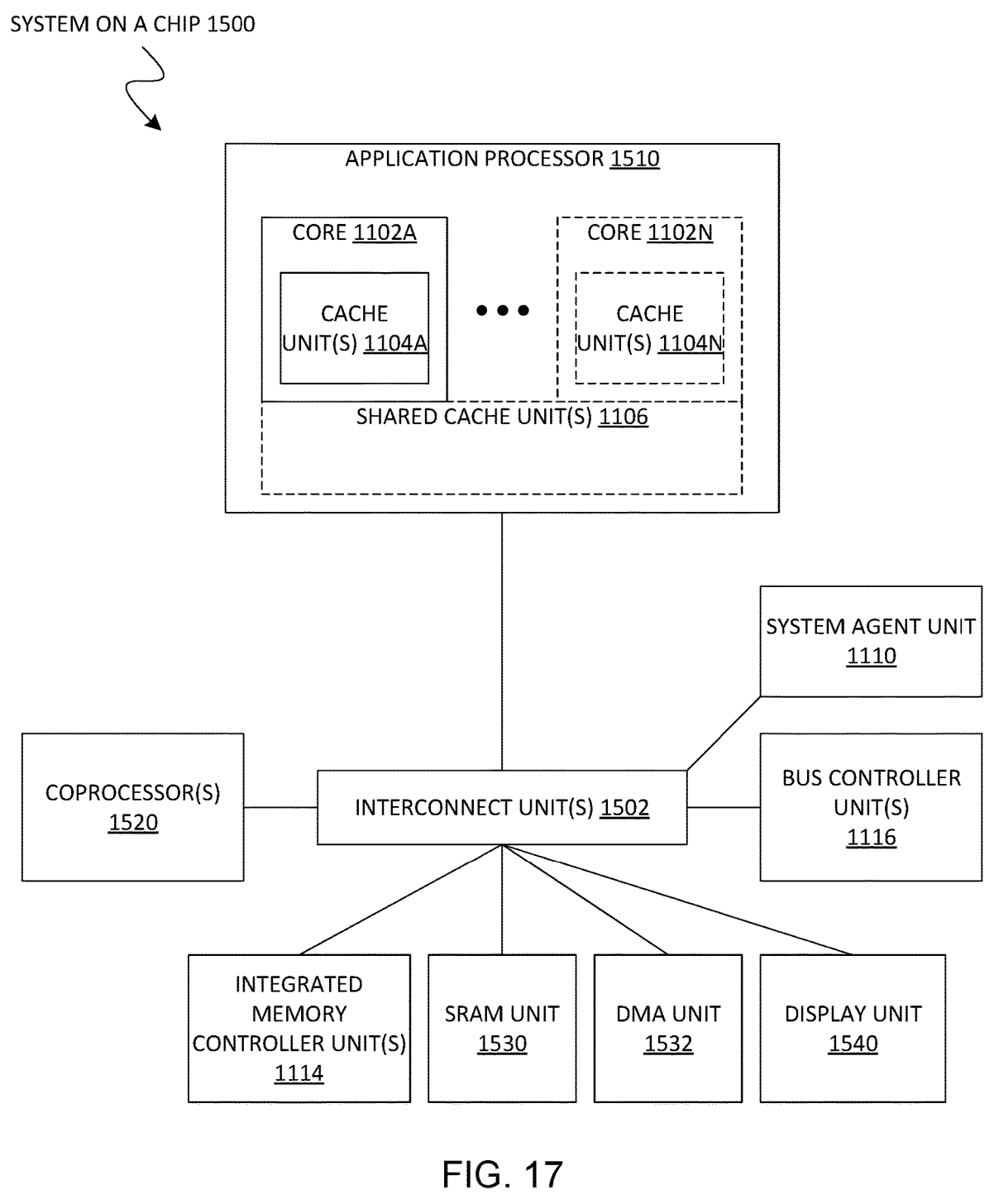

SYSTEM ON A CHIP 1500

APPLICATION PROCESSOR 1510

CORE 1102A

CACHE UNIT(S) 1104A

• • •

CORE 1102N

CACHE UNIT(S) 1104N

SHARED CACHE UNIT(S) 1106

SYSTEM AGENT UNIT 1110

COPROCESSOR(S) 1520

INTERCONNECT UNIT(S) 1502

BUS CONTROLLER UNIT(S) 1116

INTEGRATED MEMORY CONTROLLER UNIT(S) 1114

SRAM UNIT 1530

DMA UNIT 1532

DISPLAY UNIT 1540

FIG. 17

PROCESSOR WITHOUT AN X86 INSTRUCTION SET CORE 1614

PROCESSOR WITH AT LEAST ONE X86 INSTRUCTION SET CORE 1616

HARDWARE

SOFTWARE

ALTERNATIVE INSTRUCTION SET BINARY CODE 1610

INSTRUCTION CONVERTER 1612

X86 BINARY CODE 1606

ALTERNATIVE INSTRUCTION SET COMPILER 1608

X86 COMPILER 1604

HIGH LEVEL LANGUAGE 1602

APPLICATION NEGOTIABLE PLATFORM THERMAL AWARE SCHEDULER

BACKGROUND

1. Technical Field

This disclosure generally relates to processor technology, and scheduler technology.

2. Background Art

Telemetry generally refers to remote measurement. In the electronics field, telemetry may refer to local collection of measurements or other data at remote points and the transmission of the same to monitoring equipment. Telemetry data may be collected from multiple data sources and may be transmitted by wireless or wired communication processes for monitoring or analysis. In the computer field, diagnostic and/or performance data may be considered a form of telemetry. Such data may be monitored or collected and analyzed to tune the performance of a computer system.

In some systems, a hardware guided scheduler (HGS) interface is provided to communicate dynamic processor capabilities to an operating system (OS) based on power/thermal constraints. For example, hardware feedback information may be dynamically computed, including dynamically estimating processor performance and energy efficiency capabilities. In some systems, the dynamically computed processor performance and energy efficiency capabilities may be provided to an OS scheduler. The feedback information takes power and thermal constraints into account to ensure that a current hardware state is provided. In this way, an OS scheduler can make scheduling decisions that improve overall system performance and efficiency.

BRIEF DESCRIPTION OF THE DRAWINGS

The various embodiments of the present invention are illustrated by way of example, and not by way of limitation, in the figures of the accompanying drawings and in which:

FIGS. 2A to 2B are flow diagrams of an example of a method according to an embodiment;

FIG. 8 is a block diagram of an example of an application negotiable platform thermal aware scheduling (ANPTAS) circuit according to an embodiment;

FIGS. 9A and 9B are illustrative tables of an example of a data structure according to an embodiment;

FIGS. 14-17 are block diagrams of exemplary computer architectures; and

DETAILED DESCRIPTION

Figure 1:
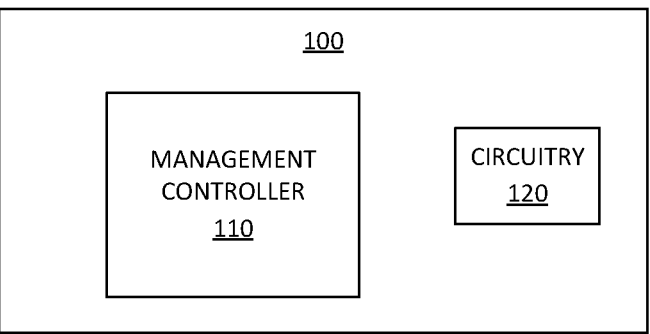
FIG. 1 is a block diagram of an example of an integrated circuit (IC) according to an embodiment.

Embodiments discussed herein variously provide techniques and mechanisms for an application negotiable platform thermal aware scheduler. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide application negotiable platform thermal aware scheduling.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for application negotiable platform thermal aware scheduling (ANPTAS) for efficient workload acceleration on computer platforms meeting application requirements such as service level agreements (SLAs). In electronic design, a semiconductor intellectual property (IP) core (SIP core), IP core, or IP block may refer to a reusable unit of logic, cell, or integrated circuit (IC) layout design. For example, ICs such as application-specific integrated circuits (ASICs), systems of field-programmable gate array (FPGA) logic, system-on-chips (SOCs), etc., may use IP blocks as part of an IC device design. As used herein, a circuit block refers to a unit of logic, cell, or integrated circuit (IC) layout design, and encompasses re-usable blocks such as IP blocks. The placement of the circuit blocks, routing, heatsink locations, etc., make up the physical layout characteristics of the IC device.

The thermal characteristics of the individual IP blocks on an SOC play an important role in defining the overall thermal sensitivity behavior of the SOC. The location of IP blocks on a SOC leads to asymmetric thermal behaviors in a SOC. For example, in multicore systems the thermal behaviors of cores will vary depending on their location on the die relative to other IP block structures. For a chiplet package (e.g., integrated device manufacturer (IDM) 2.0), for example, these thermal characteristics may be important in defining the power profiles of the chips. The varying characteristics of the thermal profile across the numerous aspects of the package/device, if handled reactively, can lead to significant overhead in terms of throttling and excessive cooling costs, resulting in poor performance, user experience and total cost of ownership (TCO) for users.

A challenge for a conventional OS scheduler is that the OS scheduler does not have sufficient physical design layout information to be able to dynamically infer platform thermal sensitivities prior to workload scheduling. For example, a conventional thermal pressure handler may reactively manage thermal design power (TDP) with no consideration of the IC device physical layout factored in while handling platform thermal assertions. Asymmetric thermal characteristics of CPU core(s) and device/platform level aspects are not considered in conjunction with application-level SLA requirements when optimizing dynamically for platform thermal efficiency. A conventional reactive approach may be less effective because after thermal assertions beyond thresholds are detected, cooling and recovery takes a significant amount of time (e.g., seconds to minutes) to return to normal operating envelopes, thereby negatively impacting the application performance.

Some embodiments advantageously provide technology to overcome one or more of the foregoing problems. In accordance with some embodiments, ANPTAS technology considers the physical layout of a device (e.g., such as a SOC), and provides scheduling recommendations based on the physical layout of the device. For example, embodiments of ANPTAS technology may consider IP block placement, recovery times of the IP blocks after throttling, IP blocks' effects on neighboring IPs blocks performance, physical features such as non-uniform memory access (NUMA) effects on individual IP blocks, etc., that may be attributable to the physical design layout constraints.

Some hardware-guided scheduler (HGS) technology may focus on microarchitecture features rather than physical design features, and may consider thermal efficiency and frequency scaling factors when providing current hardware state feedback to the OS scheduler. Embodiments of ANPTAS technology may make further considerations for providing recommendations to the OS scheduler. Some embodiments may be utilized in a standalone manner or together with a HGS for improved performance on a computer platform. For example, embodiments may utilize the SOC design physical design characteristics to augment a HGS to provide a better scheduling recommendation to the OS or, if HGS is not available or enabled in the system, then embodiments of ANPTAS technology may work independently to provide recommendations directly to the OS scheduler based on the physical design layout of SOC. In some embodiments, ANPTAS technology may utilize the physical design information such as IP block layout along with thermal sensitivities baseline information per block to make recommendations to the OS scheduler.

Some embodiments may include instructions/circuitry to calculate thermal efficiency profiles for each IP block at a fine-grained level by considering each IP block's placement on the SOC, dynamic thermal profiles of neighboring IP blocks, and the effect of the foregoing on each IP block's performance. Some embodiments may then provide dynamic scheduling recommendations to the OS scheduler, thereby supporting improved or optimal placement of applications on the SOC to provide a better user experience and platform reliability with TCO savings. Advantageously, embodiments of ANPTAS technology that provides scheduling recommendations to an OS scheduler based on core placement location in a SOC (e.g., in addition to other core performance and thermal efficiency considerations) may demonstrate a significant performance boost in a multi-core processor.

Some embodiments may utilize a dynamic model of the individual SOC IP blocks and each IP block's optimum performance considering the physical design layout of the SOC, thermal efficiencies, and activity factors of the other modeled IP blocks. The model may be utilized to proactively provide the OS information about on which IP block to optimally schedule threads. The model may or may not be utilized in conjunction with HGS technology. The model may also be utilized in combination with application SLA requirements by the OS scheduler to pick the highest performant core(s) based on the active/current temperatures, physical design of the SOC, and with application inputs.

For example, the model may be implemented as a data structure (e.g., a table, a set of tables, a decision matrix, etc.) that stores information about the IP block's thermal behavior and performance and various physical design factors that may affect the IP block's thermal behavior and performance (e.g., activity on other IP blocks, thermal behavior of other IP blocks, application requirements, etc.). Embodiments may then monitor the relevant information (e.g., current thermal measurements of the IP block and other IP blocks, current activity of the IP block and other IP blocks, etc.) and then utilize the data structure to determine the recommendation.

Suitable logic and/or circuitry to implement the ANPTAS technology described herein may be incorporated at any suitable location in a computer system. Different electronic systems or platforms may include a variety of controllers including, for example, a memory controller (MC), a system management controller (SMC), a power management unit (PMU or P-Unit), a power control unit (PCU), a system management unit (SMU), a power management integrated circuit (PMIC), a baseboard management controller (BMC), etc. A PCU, P-Unit, or PMIC may be implemented as a microcontroller that governs power and other functions of a system/platform. The P-unit/PMIC may include its own dedicated firmware/software, memory, a central processor unit (CPU), input/output (TO) functions, timers, analog-to-digital (A/D) converters, etc. In some systems, the PCU/P-Unit/PMIC may remain active even when the system is otherwise shut down. Although nominally referred to for its power management capabilities, the PCU/P-Unit/PMIC may also manage other functions such as IO, interfacing with built in keypads/touchpads, clock regulation, etc. Likewise, other management controllers that do not nominally refer to power management (e.g., a SMU, a SMC, a BMC), may also manage power or power-related functions. A BMC may also be implemented as a microcontroller, generally located on a motherboard of a system/platform (e.g., a server). The BMC may include its own firmware/memory/etc. and manages an interface between system-management software and platform hardware. In accordance with some embodiments, one or more of the foregoing example controllers may be further configured with the ANPTAS technology described herein to provide schedule recommendations to an OS scheduler.

With reference to FIG. 1, an embodiment of an integrated circuit 100 may include a management controller 110 and circuitry 120 (e.g., ANPTAS circuitry) communicatively coupled to the management controller 110. For example, the circuitry 120 may be configured to dynamically determine a performance measurement for each of two or more circuit blocks based at least in part on the physical design layout of the two or more circuit blocks, and report a schedule recommendation to an OS scheduler based at least in part on the determined performance measurements. In some embodiments, the circuitry 120 may be further configured to dynamically estimate a thermal sensitivity for each of the two or more circuit blocks based at least in part on the physical design layout of the two or more circuit blocks, to dynamically determine a performance measurement for a first circuit block of the two or more circuit blocks based at least in part on an estimated recovery time of the first circuit block, and/or to dynamically determine a thermal efficiency profile for a first circuit block of the two or more circuit blocks based at least in part on respective thermal efficiency profiles of one or more circuit blocks arranged physically proximate to the first circuit block. The circuitry 120 may also be configured to dynamically determine a performance measurement for a first circuit block of the two or more circuit blocks based at least in part on activity on a second circuit block of the two or more circuit blocks. For example, the first circuit block may comprise a core block and the second circuit block may comprise a non-core block (e.g., a GPU, a controller, etc.).

In some embodiments, the circuitry 120 may be additionally or alternatively configured to determine the schedule recommendation based at least in part on the determined performance measurements and in part on an application specific requirement. In some embodiments, the two or more circuit blocks may include two or more cores, and the circuitry 120 may be further configured to determine the schedule recommendation for a recommended combination of cores to be utilized based on a data structure that indicates a combination of the two or more cores that provides a best thermal efficiency. In some embodiments, the circuitry 120 may be further configured to provide the determined performance measurements to a HGS, and to report the schedule recommendation to the OS scheduler from the HGS.

Figure 10:
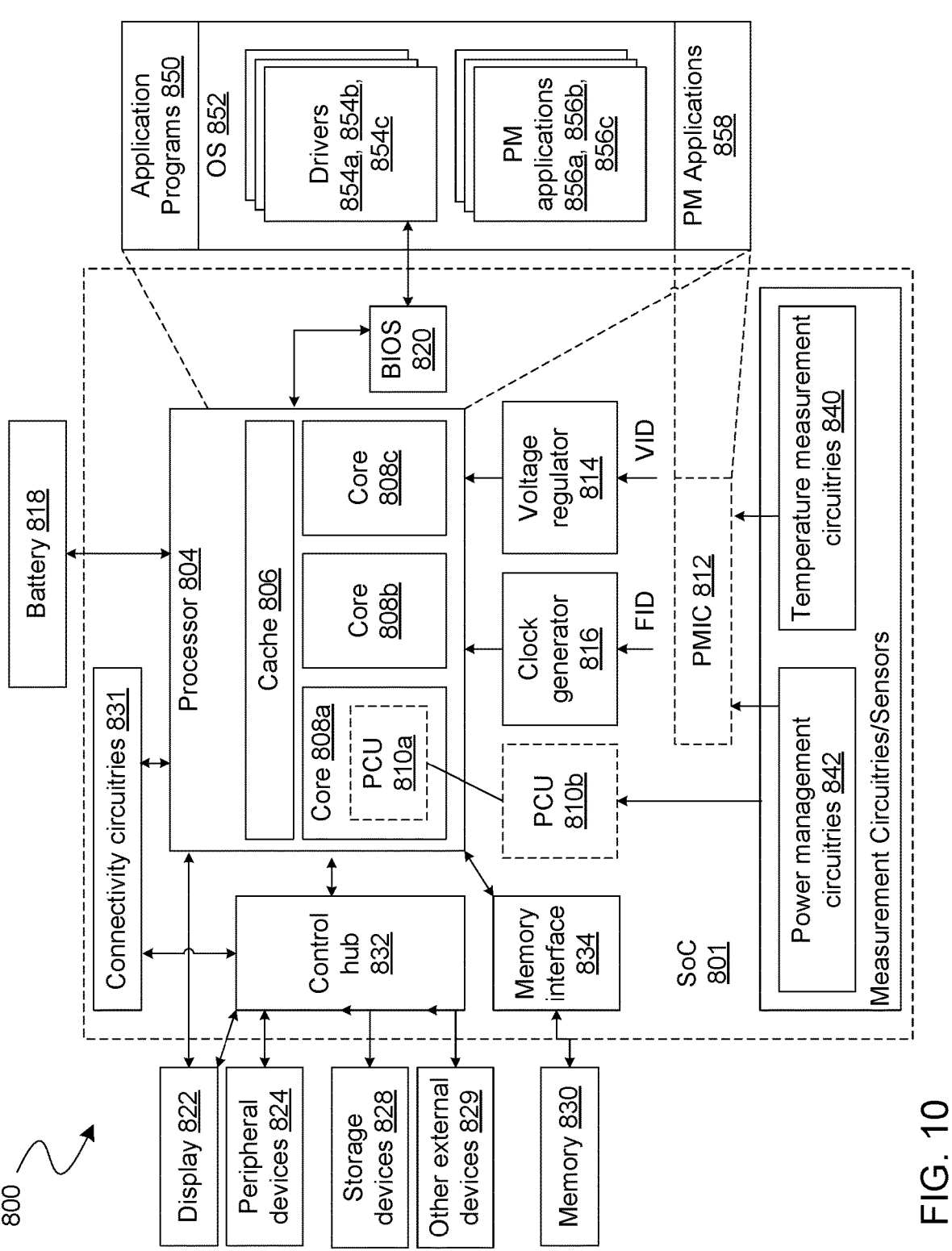
FIG. 10 is a block diagram of an example of a computing system according to an embodiment.
Figure 18:
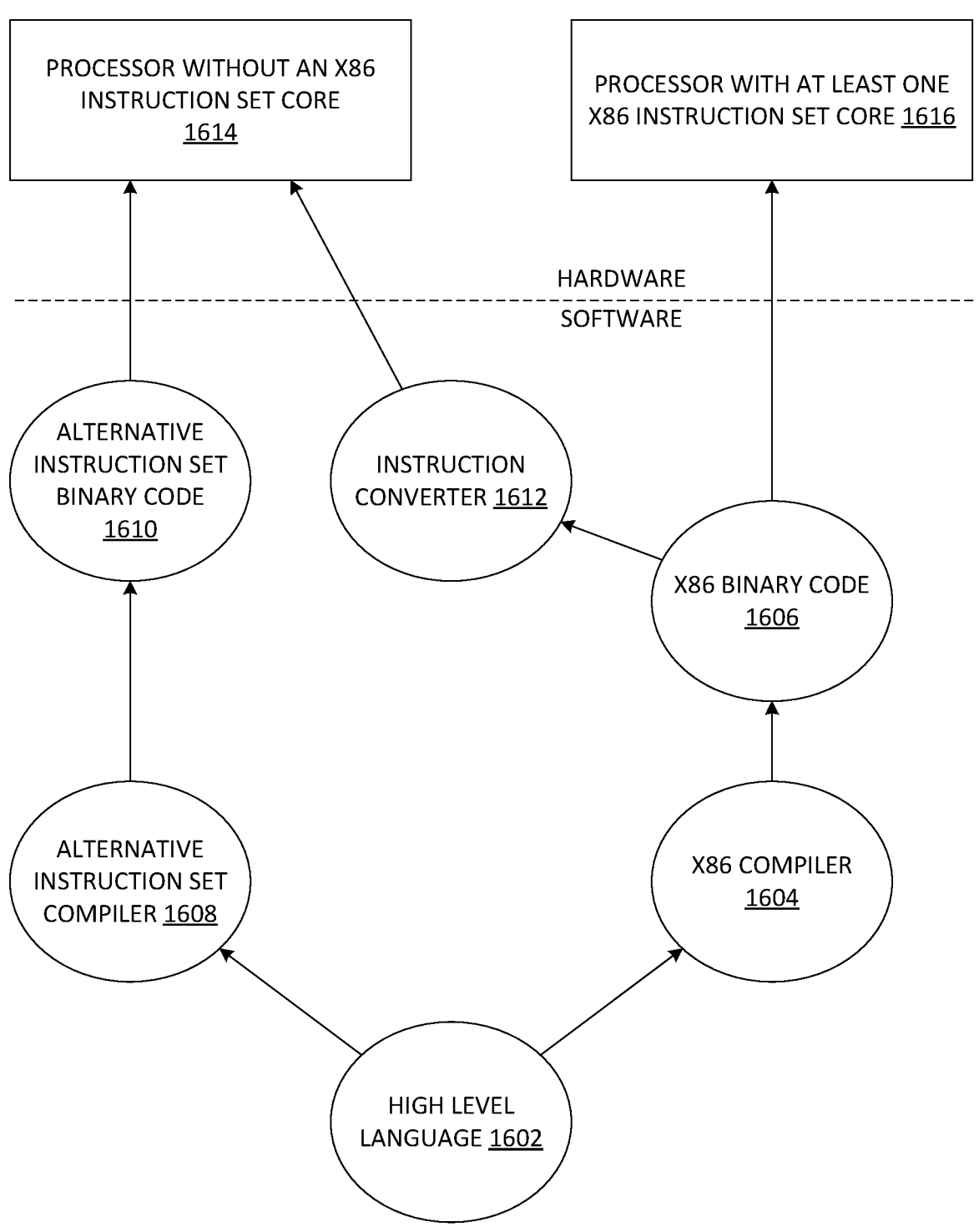
FIG. 18 is a block diagram contrasting the use of a software instruction converter to convert binary instructions in a source instruction set to binary instructions in a target instruction set according to embodiments of the invention.

Embodiments of the management controller 110 and/or circuitry 120 may be incorporated in or integrated with any suitable controller of an electronic system/platform including, for example, a PCU, a PMIC, a P-Unit, a MC, etc. Although illustrated in FIG. 1 as being separate from the management controller 110, in some embodiments all or portion of the circuitry 120 may be co-located with the management controller 110. Embodiments of the integrated circuit 100, including the management controller 110, and/or the circuitry 120, may be integrated with a processor such as those described herein including, for example, the processor 804 (FIG. 10), the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). In particular, embodiments of the circuitry 120 may be incorporated in the PCU 810a,b (FIG. 10), and/or the PMIC 812 (FIG. 10).

Figure 2A:
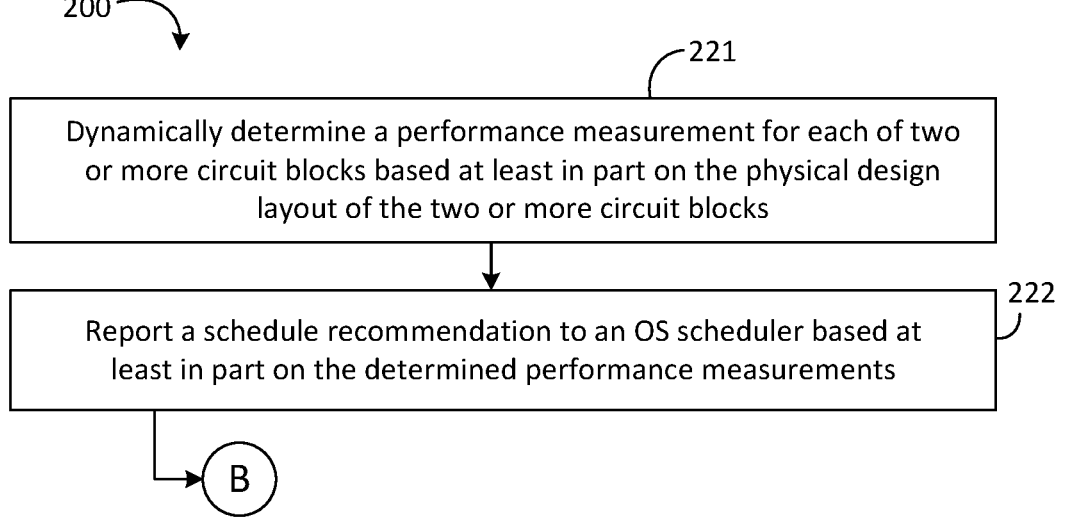

With reference to FIGS. 2A to 2B, an embodiment of a method 200 may include, at runtime, dynamically determining a performance measurement for each of two or more circuit blocks based at least in part on the physical design layout of the two or more circuit blocks at box 221, and reporting a schedule recommendation to an OS scheduler based at least in part on the determined performance measurements at box 222. Some embodiments of the method 200 may further include dynamically estimating a thermal sensitivity for each of the two or more circuit blocks based at least in part on the physical design layout of the two or more circuit blocks at box 223, dynamically determining a performance measurement for a first circuit block of the two or more circuit blocks based at least in part on an estimated recovery time of the first circuit block at box 224, and/or dynamically determining a thermal efficiency profile for a first circuit block of the two or more circuit blocks based at least in part on respective thermal efficiency profiles of one or more circuit blocks arranged physically proximate to the first circuit block at box 225. The method 200 may also include dynamically determining a performance measurement for a first circuit block of the two or more circuit blocks based at least in part on activity on a second circuit block of the two or more circuit blocks at box 226. For example, the first circuit block may comprise a core block and the second circuit block may comprise a non-core block at box 227.

Some embodiments of the method 200 may additionally or alternatively include determining the schedule recommendation based at least in part on the determined performance measurements and in part on an application specific requirement at box 228. In some embodiments, the two or more circuit blocks may include two or more cores at box 229, and the method 200 may further include determining the schedule recommendation for a recommended combination of cores to be scheduled based on a data structure that indicates a combination of the two or more cores that provides a best thermal efficiency at box 230. Some embodiments of the method 200 may also include providing the determined performance measurements to a HGS at box 231, and reporting the schedule recommendation to the OS scheduler from the HGS at box 232.

Embodiments of the method 200 may be performed at runtime by a processor such as those described herein including, for example, the processor 804 (FIG. 10), the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). Alternatively, embodiments of the method 200 may be performed by a controller such as those described herein. In particular, embodiments of the method 200 may be performed by the PCU 810a,b (FIG. 10), and/or the PMIC 812 (FIG. 10).

Figure 3:
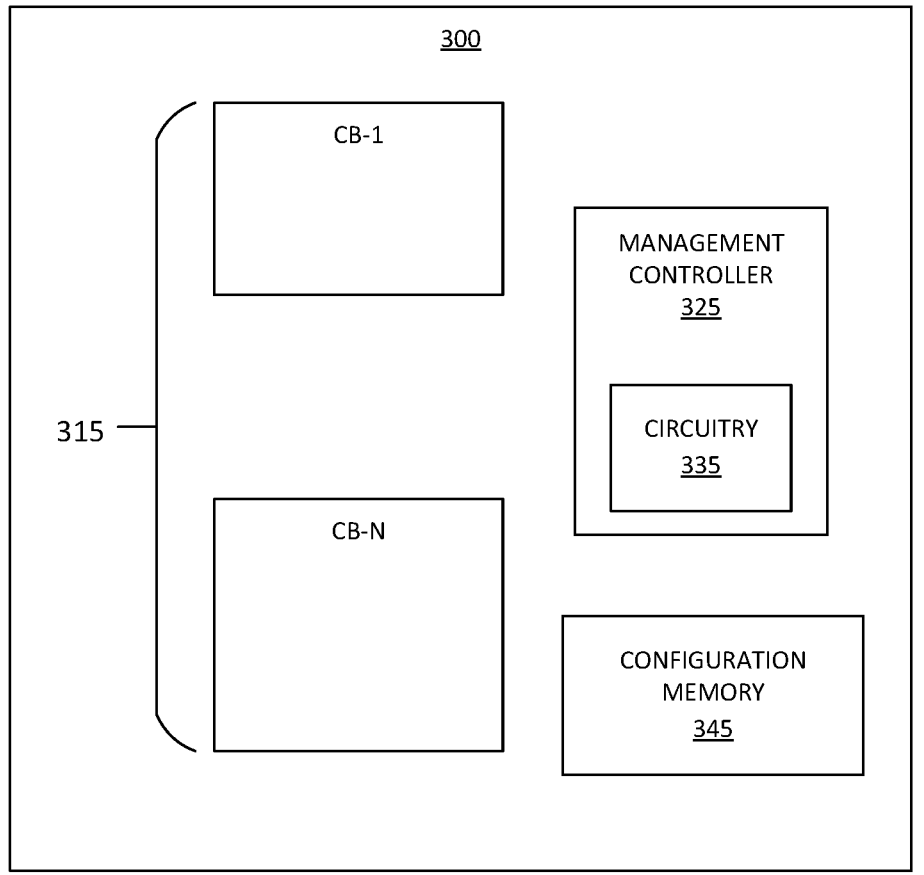
FIG. 3 is a block diagram of an example of an apparatus according to an embodiment.

With reference to FIG. 3, an embodiment of an apparatus 300 may include two or more circuit blocks (CBs) 315 (e.g., CB-1 through CB-N, where N>1) and a management controller 325 communicatively coupled to the CBs 315. The CBs 315 may be arranged on a same substrate in a physical design layout with asymmetric thermal characteristics (e.g., and on the same substrate with the management controller 325 in some embodiments). The management controller 325 may include circuitry 335 to dynamically determine a performance measurement for each of the CBs 315 based at least in part on the physical design layout of the CBs 315, and to report a schedule recommendation to an OS scheduler based at least in part on the determined performance measurements. In some embodiments, the circuitry 335 may be further configured to dynamically estimate a thermal sensitivity for each of the CBs 315 based at least in part on the physical design layout of the CBs 315, dynamically determine a performance measurement for a first circuit block of the CBs 315 based at least in part on an estimated recovery time of the first circuit block, and/or dynamically determine a thermal efficiency profile for a first circuit block of the CBs 315 based at least in part on respective thermal efficiency profiles of one or more circuit blocks arranged physically proximate to the first circuit block. The circuitry 335 may also be configured to dynamically determine a performance measurement for a first circuit block of the CBs 315 based at least in part on activity on a second circuit block of the CBs 315. For example, the first circuit block may comprise a core block and the second circuit block may comprise a non-core block.

In some embodiments, the circuitry 335 may be additionally or alternatively configured to determine the schedule recommendation based at least in part on the determined performance measurements and in part on an application specific requirement. In some embodiments, CBs 315 include two or more cores, and the circuitry 335 may be further configured to determine the schedule recommendation for a recommended combination of cores to be utilized based on a data structure that indicates a combination of the two or more cores that provides a best thermal efficiency. In some embodiments, the circuitry 335 may also be configured to provide the determined performance measurements to a HGS, and report the schedule recommendation to the OS scheduler from the HGS.

In some embodiments, the apparatus 300 may further include configuration memory 345 to store the configuration information for the management controller 325. The configuration memory 345 may be implemented with any suitable storage technology such as a buffer, a set of registers, model specific registers (MSRs), RAM, PROM, EEPROM, etc. The configuration information may have any suitable data structure, such as a table of entries for each circuit block. Each entry in the table may include one or more fields that store different values for the circuit block (e.g., either the circuit block itself or an identifier associated with the circuit block) and a value for various factors associated with the circuit block.

Embodiments of the CBs 315, the management controller 325, and/or the circuitry 335, may be integrated with a processor such as those described herein including, for example, the processor 804 (FIG. 10), the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). In particular, embodiments of the circuitry 335 may be incorporated in the PCU 810*a,b* (FIG. 10), and/or the PMIC 812 (FIG. 10).

Embodiments of ANPTAS technology may provide dynamic estimation of thermal sensitivity as described above to facilitate proactive workload scheduling and platform thermal management, factoring in application SLA requirements. For example, embodiments may provide calculated dynamic thermal efficiencies along with the application-mandated SLA as variables to facilitate appropriate core or virtual machine (VM) assignments. Advantageously, embodiments may provide efficient scaling of ANPTAS/sockets/platforms across multiple SOCs involving heterogeneous circuit blocks (e.g., custom circuit blocks or licensed IP blocks). In some implementations, embodiments of ANPTAS technology for dynamic modeling of the thermal efficiencies of the circuit/IP blocks on a SOC may advantageously provide increased application performance/watt approaching SOC and platform rooflines.

Figure 4A:
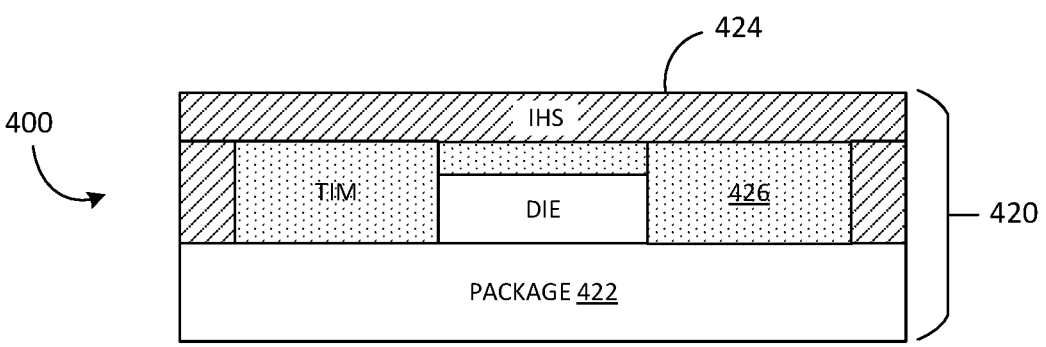
FIG. 4A is a block diagram of an example of an IC device according to an embodiment.
Figure 4B:
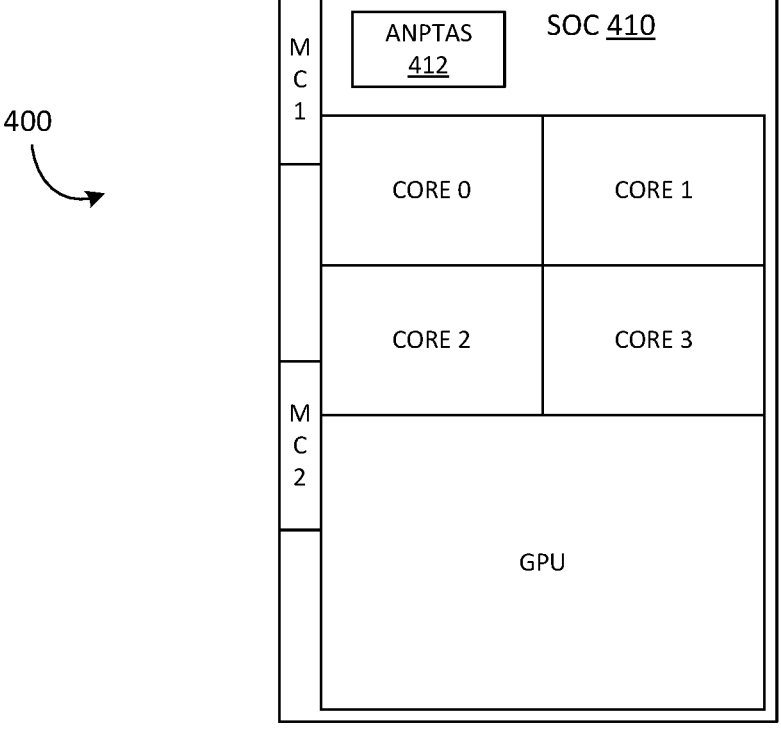
FIG. 4B is a block diagram of an example of a die of a system-on-a-chip (SOC) according to an embodiment.

With reference to FIGS. 4A, an embodiment of an IC device 400 includes a die of an SOC 410 disposed in an IC package 420. FIG. 4B shows an embodiment of the SOC 410 that comprises a die with multiple IP blocks therein including the illustrated four cores (Core 0, Core 1, Core 2, and Core 3), a graphics processor unit (GPU), and two memory controllers (MC 1, MC 2). The die of the SOC 410 is mounted between a package substrate 422 and an integrated heat spreader (IHS) 424. Thermal interface material (TIM)

426 is provided around the die of the SOC 410 and between the package substrate 422 and the IHS 424. The SOC 410 further comprises an ANPTAS circuit 412 that implements one or more aspects of the embodiments described herein. Although illustrated as a separate circuit, in some embodiments the ANPTAS circuit 412 may be incorporated in one of the other circuit blocks in the SOC 410 (e.g., one of the controllers). Alternatively, in some embodiments the ANPTAS circuit 412 may be incorporated in another controller that is coupled to the SOC (e.g., an external PMIC, a PCU, etc.).

An SOC with multiple IP blocks (e.g., such as SOC 410) has asymmetric thermal sensitivities across each IP block. A similar IP blocked placed at different locations in an SOC will have different thermal sensitivities due to the different physical location on the die, different IP blocks in the neighborhood (e.g., such as GPU circuit blocks, memory controller circuit blocks, etc.), variation of thermal conductance of TIM between the die and the IHS, etc.

Figure 5:
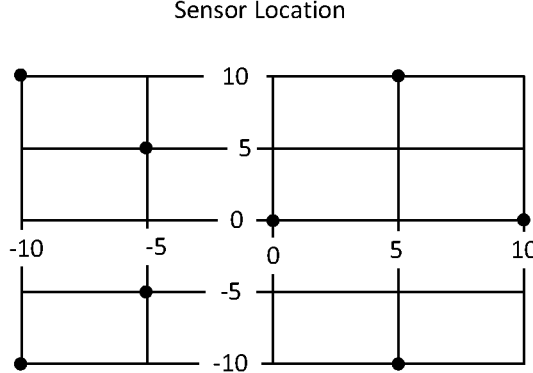
FIG. 5 is an illustrative diagram of an example of sensor locations on a SOC according to an embodiment.

FIG. 5 shows an embodiment of an illustrative graph of example temperature sensor monitor locations (e.g., for the die of the SOC 410). Table 1 indicates an illustrative variation in the thermal conductivity (K Value) of TIM+IHS at multiple locations indicated by the respective X and Y locations of sensors on the die. As is apparent from the values listed in Table 1, there may be a large variation in the thermal sensitivity at various locations on the die where temperature is monitored.

TABLE 1

| X | Y | K Value |
|---|---|---------|
| 0 | 0 | 20 |
| 5 | 10 | 10 |
| 5 | −10 | 5 |
| 10 | 0 | 5 |
| −5 | 5 | 30 |
| −5 | −5 | 10 |
| −10 | 10 | 5 |
| −10 | −10 | 15 |

Another source of different thermal sensitivity is the asymmetrical nature of a typical SOC layout. As shown in FIG. 4B, the four cores all have different IP blocks next to each of the cores. The different neighboring IP blocks may result different thermal sensitivities and behavior profiles for each of the cores (e.g., even if the cores are otherwise similar). These asymmetric thermal sensitivities may have a significant effect on performance, particularly in a thermally constrained systems such as edge devices. Advantageously, some embodiments of ANPTAS technology utilize a fine-grained approach that dynamically accounts for IP block thermal behavior profiles and neighboring effects.

Figure 6:
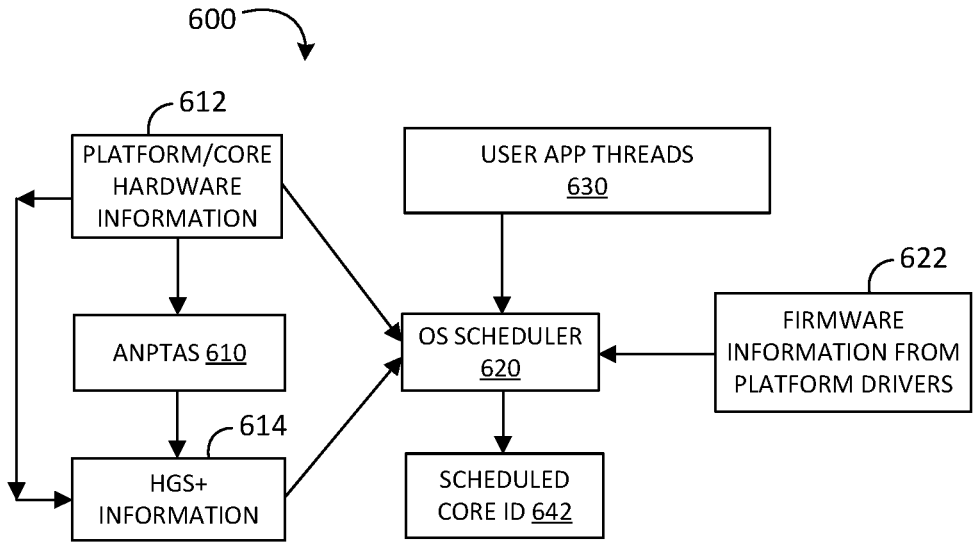
FIG. 6 is an illustrative diagram of an example of a process flow according to an embodiment.

With reference to FIG. 6, an embodiment of a process 600 includes an ANPTAS circuit 610 utilizing platform/core hardware information at box 612 to determine scheduling information based on the physical layout of the device and combining the scheduling information with further HGS information at box 614 to provide a scheduling recommendation to an OS scheduler 620. The process 600 then includes the OS scheduler 620 receiving firmware information from platform drivers at box 622 and utilizing the scheduling information and other information (e.g., the firmware information, application SLA information, etc.) for scheduling user application threads at box 630 and providing scheduled core IDs at box 642. Advantageously, embodiments of the process 600 may utilize thermal telemetry to provide individual IP block thermal sensitivities based on design layout information of an SOC/hardware platform to the OS scheduler 620.

Figure 7:
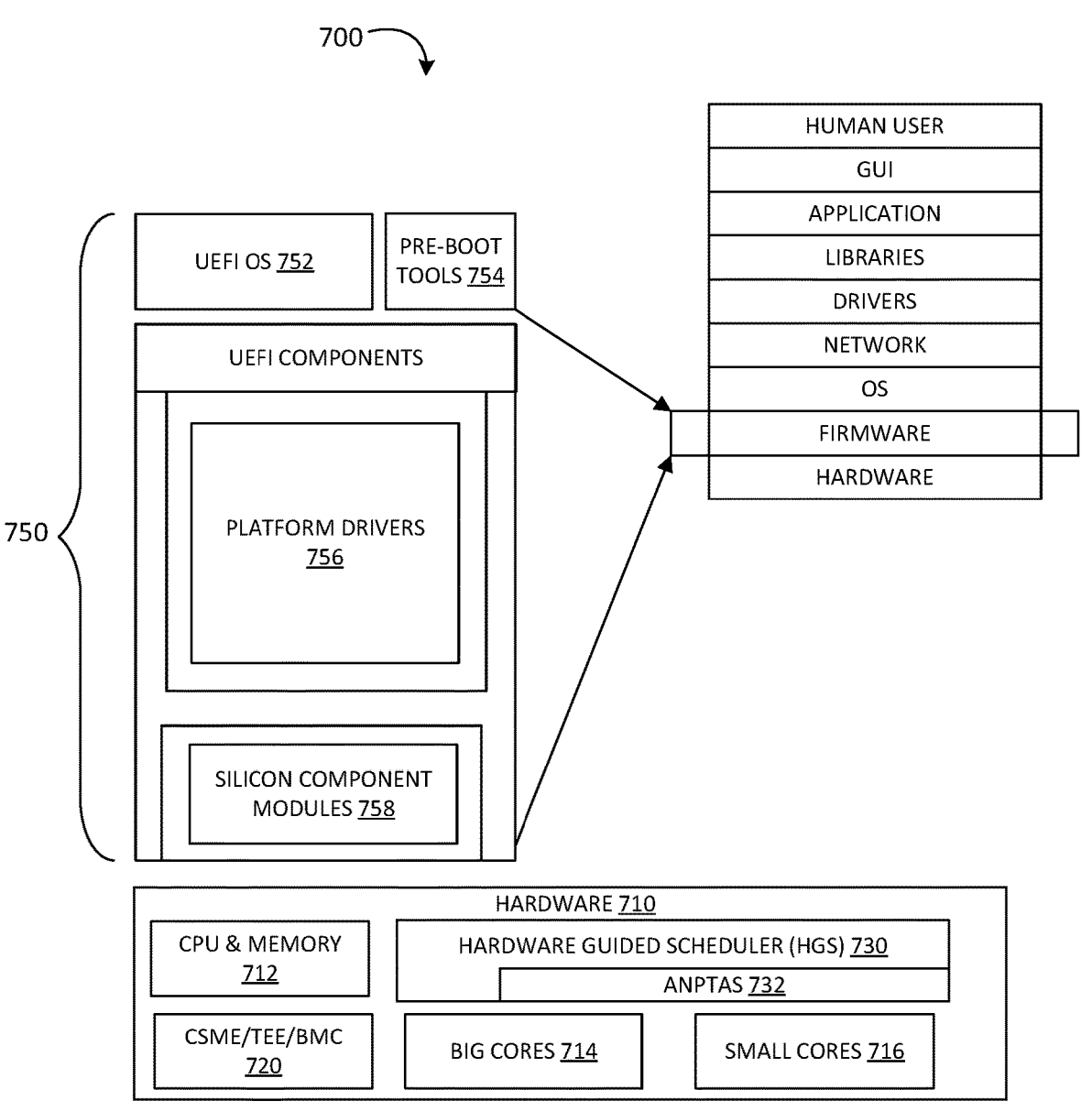
FIG. 7 is a block diagram of an example of a system according to an embodiment.

With reference to FIG. 7, an embodiment of a system 700 includes hardware 710 and software 750. The hardware 710 includes CPU and memory components 712, multiple cores including big cores 714 and small cores 716, various security and controller components 720 (e.g., such as INTEL Converged Security and Management Engine (CSME), a trusted execution environment (TEE), a baseboard management controller (BMC), etc.), and a HGS 730 that incorporates an ANPTAS circuit 732. The software 750 includes various unified extensible firmware interface (UEFI) components including a UEFI OS 752, pre-boot tools 754, and UEFI platform initialization components (e.g., platform drivers 756, silicon component modules 758). A full system stack between the hardware 710 and a user may include firmware, an OS, a network interface, drivers, libraries, applications, and a graphical user interface. In accordance with some embodiments, the hardware 710 provides platform telemetry (e.g., to be used by the HGS 730 and the ANPTAS circuit 732), the OS and the firmware provide thermal telemetry exposure and resource reservation, and the OS includes an OS scheduler that includes a thermal aware mode.

In some embodiments, the ANPTAS circuit 732 monitors the thermal temperatures and considers the SOC layout characteristics including but not limited to information regarding IP block placement, routing, and heat sinks, along with thermal sensitivities of the IP blocks to provide recommendations to the OS or to the OS via the HGS 730 to schedule the threads. For example, if a GPU unit is turned on in an IP block, then the ANPTAS circuit 732 may provide a schedule recommendation to the OS scheduler that indicates preferred use for the cores further away from the GPU unit so that the scheduled cores do not get thermally throttled because of activity in the GPU unit. In another example, if an application needs more memory then the ANPTAS circuit 732 may provide a schedule recommendation to the OS scheduler that indicates preferred use for the cores that have more bandwidth available (e.g., as opposed to other more bandwidth-limited cores). Although the ANPTAS circuit 732 is illustrated in FIG. 7 as being incorporated in the HGS 730, in some embodiments the ANPTAS circuit 732 may have a standalone mode where the ANPTAS circuit 732 does not require that an HGS module be available and may provide physical design and thermal sensitivity profiles either collaboratively or independently.

Figures 8, 9A:
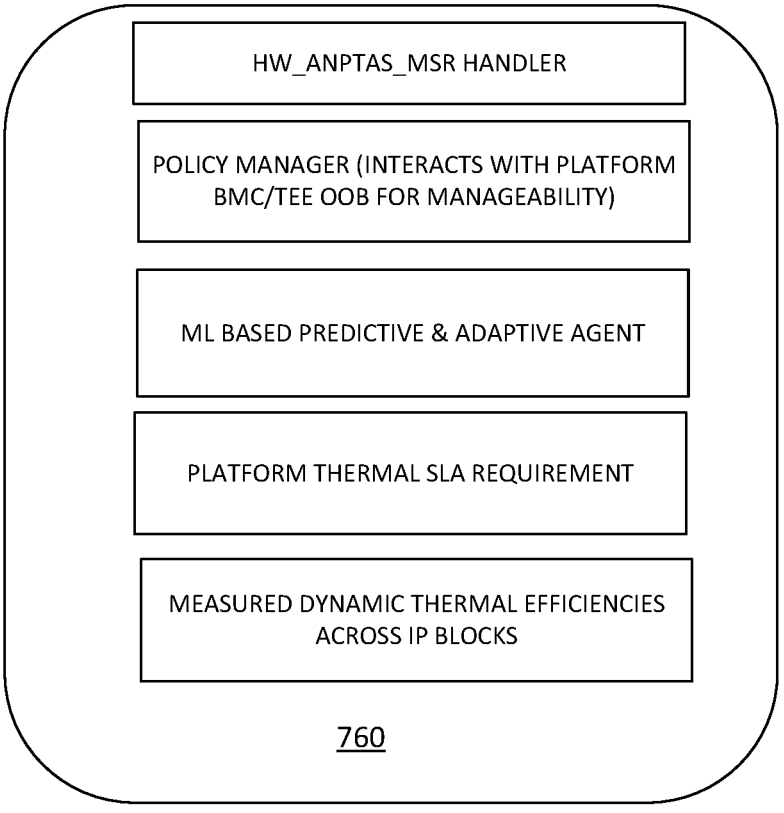

With reference to FIG. 8, an embodiment of an ANPTAS circuit 760 may be substituted for various of the circuits described herein (e.g., circuitry 120, circuitry 335, ANPTAS circuit 412, ANPTAS circuit 610, ANPTAS circuit 732, etc.). As shown in FIG. 8, the ANPTAS circuit 760 may include a variety of modules that may be utilized to provide a schedule recommendation based on a physical design layout of two or more circuit blocks. As illustrated, the ANPTAS circuit 760 includes a hardware MSR handler, a policy manager (e.g., to interact with a platform BMC/TEE out of band (000) for manageability), a machine learning (ML) based predictive and adaptive agent, a platform thermal SLA requirement module, and a module to monitor measured dynamic thermal efficiencies across circuit blocks (e.g., including IP blocks). Other embodiments may include more or fewer modules.

In one operational example, a multi-core processor may include two cores with similar temperature profiles (e.g., an average temperature for a workload may stay within a range of about one degree Celsius over the workload timeline). The two cores may have a similar temperature operating range. However, the operational frequency of the cores may be different. For example, the first core may operate around 400 MHz faster than the second core, leading to a performance difference where an average workload speed is higher over the workload timeline for the first core as compared the second core.

FIGS. 9A and 9B show embodiments of tables that may be utilized by an ANPTAS circuit to provide recommendations to an OS scheduler for a multi-core processor with four cores where asymmetric thermal behavior may impact performance. The two tables may be utilized as a decision matrix for picking a best combination of active cores for one or more workloads on the four cores. The table illustrated in FIG. 9A indicates a best combination of cores for a specified number of active cores. The table in FIG. 9B shows a speed matrix for a specified number of active cores, with all the possible combinations for core selection. As shown in FIG. 9A, in the example four-core environment, an application requesting a single core gets mapped to Core 1. However, if the application requests two cores then the best combination would be Core 1 and Core 2 because of the different IP block thermal characteristics.

Embodiments of the ANPTAS technology described herein may be implemented at various levels of detail and may be configured to be accessed at a firmware or driver level to take application requirements, SLA requirements, and/or quality-of-service (QoS) information to dynamically migrate applications on the SOC due to temporal or transient thermal events.

FIG. 10 illustrates a computer system or computing device 800 (also referred to as device 800), where ANPTAS technology, in accordance with some embodiments, provides schedule recommendations to an OS scheduler based on a physical layout design of two or more circuit blocks.

In some embodiments, device 800 represents an appropriate computing device, such as a computing tablet, a mobile phone or smart-phone, a laptop, a desktop, an Internet-of-Things (JOT) device, a server, a wearable device, a set-top box, a wireless-enabled e-reader, or the like. It will be understood that certain components are shown generally, and not all components of such a device are shown in device 800.

In an example, the device 800 comprises a SOC 801. An example boundary of the SOC 801 is illustrated using dotted lines in FIG. 10, with some example components being illustrated to be included within SOC 801—however, SOC 801 may include any appropriate components of device 800.

In some embodiments, device 800 includes processor 804. Processor 804 can include one or more physical devices, such as microprocessors, application processors, microcontrollers, programmable logic devices, processing cores, or other processing means. The processing operations performed by processor 804 include the execution of an operating platform or OS on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores 808a, 808b, 808c (also referred to individually or collectively as core(s) 808). Although merely three cores 808a, 808b, 808c are illustrated in FIG. 10, the processor 804 may include any other appropriate number of processing cores, e.g., tens, or even hundreds of processing cores. Processor cores 808*a*, 808*b*, 808*c* may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808*a*, a second section of cache 806 dedicated to core 808*b*, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, a core 808 of the processor 804 may include a fetch unit to fetch instructions (including instructions with conditional branches) for execution by the core 808. The instructions may be fetched from any storage devices such as the memory 830. Core 808 may also include a decode unit to decode the fetched instruction. For example, the decode unit may decode the fetched instruction into a plurality of micro-operations. Core 808 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, core 808 may be an out-of-order processor core in one embodiment. Core 808 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor 804 may also include a bus unit to enable communication between components of the processor 804 and other components via one or more buses. Processor 804 may also include one or more registers to store data accessed by various components of the cores 808 (such as values related to assigned app priorities and/or sub-system states (modes) association.

In some embodiments, device 800 comprises connectivity circuitries 831. For example, connectivity circuitries 831 includes hardware devices (e.g., wireless and/or wired connectors and communication hardware) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a Platform Control Hub (PCH), and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

As mentioned above, control hub 832 can interact with audio devices, display 822, etc. For example, input through a microphone or other audio device can provide input or commands for one or more applications or functions of device 800. Additionally, audio output can be provided instead of, or in addition to display output. In another example, if display 822 includes a touch screen, display 822 also acts as an input device, which can be at least partially managed by control hub 832. There can also be additional buttons or switches on computing device 800 to provide I/O functions managed by control hub 832. In one embodiment, control hub 832 manages devices such as accelerometers, cameras, light sensors or other environmental sensors, or other hardware that can be included in device 800. The input can be part of direct user interaction, as well as providing environmental input to the system to influence its operations (such as filtering for noise, adjusting displays for brightness detection, applying a flash for a camera, or other features).

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.). In one embodiment display 822 can be a head mounted display (HMD) such as a stereoscopic display device for use in virtual reality (VR) applications or augmented reality (AR) applications.

In some embodiments and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Additionally, a docking connector can allow device 800 to connect to certain peripherals that allow computing device 800 to control content output, for example, to audiovisual or other systems.

In addition to a proprietary docking connector or other proprietary connection hardware, device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800. Memory can include nonvolatile (state does not change if power to the memory device is interrupted) and/or volatile (state is indeterminate if power to the memory device is interrupted) memory devices. Memory 830 can be a dynamic random access memory (DRAM) device, a static random access memory (SRAM) device, flash memory device, phase-change memory device, or some other memory device having suitable performance to serve as process memory. In one embodiment, memory 830 can operate as system memory for device 800, to store data and instructions for use when the one or more processors 804 executes an application or process. Memory 830 can store application data, user data, music, photos, documents, or other data, as well as system data (whether long-term or temporary) related to the execution of the applications and functions of device 800.

Elements of various embodiments and examples are also provided as a machine-readable medium (e.g., memory 830) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In an example, temperature measurement circuitries 840 may be embedded, or coupled or attached to various components, whose temperature are to be measured and monitored. For example, temperature measurement circuitries 840 may measure temperature of (or within) one or more of cores 808a, 808b, 808c, voltage regulator 814, memory 830, a mother-board of SOC 801, and/or any appropriate component of device 800.

In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SOC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. Merely as an example, VR 814 is illustrated to be supplying signals to processor 804 of device 800. In some embodiments, VR 814 receives one or more Voltage Identification (VID) signals, and generates the voltage signal at an appropriate level, based on the VID signals. Various type of VRs may be utilized for the VR 814. For example, VR 814 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 810a/b and/or PMIC 812. In some embodiments, each core has a network of distributed LDOs to provide efficient control for power management. The LDOs can be digital, analog, or a combination of digital or analog LDOs.

In some embodiments, device 800 comprises one or more clock generator circuitries, generally referred to as clock generator 816. Clock generator 816 generates clock signals at appropriate frequency levels, which may be supplied to any appropriate components of device 800. Merely as an example, clock generator 816 is illustrated to be supplying clock signals to processor 804 of device 800. In some embodiments, clock generator 816 receives one or more Frequency Identification (FID) signals, and generates the clock signals at an appropriate frequency, based on the FID signals.

In some embodiments, device 800 comprises battery 818 supplying power to various components of device 800. Merely as an example, battery 818 is illustrated to be supplying power to processor 804. Although not illustrated in the figures, device 800 may comprise a charging circuitry, e.g., to recharge the battery, based on Alternating Current (AC) power supply received from an AC adapter.

In some embodiments, device 800 comprises Power Control Unit (PCU) 810 (also referred to as Power Management Unit (PMU), Power Controller, etc.). In an example, some sections of PCU 810 may be implemented by one or more processing cores 808, and these sections of PCU 810 are symbolically illustrated using a dotted box and labelled PCU 810a. In an example, some other sections of PCU 810 may be implemented outside the processing cores 808, and these sections of PCU 810 are symbolically illustrated using a dotted box and labelled as PCU 810b. PCU 810 may implement various power management operations for device 800. PCU 810 may include hardware interfaces, hardware circuitries, connectors, registers, etc., as well as software components (e.g., drivers, protocol stacks), to implement various power management operations for device 800.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC chip separate from processor 804. The may implement various power management operations for device 800. PMIC 812 may include hardware interfaces, hardware circuitries, connectors, registers, etc., as well as software components (e.g., drivers, protocol stacks), to implement various power management operations for device 800.

In an example, device 800 comprises one or both PCU 810 or PMIC 812. In an example, any one of PCU 810 or PMIC 812 may be absent in device 800, and hence, these components are illustrated using dotted lines.

Various power management operations of device 800 may be performed by PCU 810, by PMIC 812, or by a combination of PCU 810 and PMIC 812. For example, PCU 810 and/or PMIC 812 may select a power state (e.g., P-state) for various components of device 800. For example, PCU 810 and/or PMIC 812 may select a power state (e.g., in accordance with the ACPI (Advanced Configuration and Power Interface) specification) for various components of device 800. Merely as an example, PCU 810 and/or PMIC 812 may cause various components of the device 800 to transition to a sleep state, to an active state, to an appropriate C state (e.g., C0 state, or another appropriate C state, in accordance with the ACPI specification), etc. In an example, PCU 810 and/or PMIC 812 may control a voltage output by VR 814 and/or a frequency of a clock signal output by the clock generator, e.g., by outputting the VID signal and/or the FID signal, respectively. In an example, PCU 810 and/or PMIC 812 may control battery power usage, charging of battery 818, and features related to power saving operation.

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, PCU 810 and/or PMIC 812 performs adaptive or dynamic frequency scaling or adjustment. For example, clock frequency of a processor core can be increased if the core is not operating at its maximum power consumption threshold or limit. In some embodiments, PCU 810 and/or PMIC 812 determines the operating condition of each core of a processor, and opportunistically adjusts frequency and/or power supply voltage of that core without the core clocking source (e.g., PLL of that core) losing lock when the PCU 810 and/or PMIC 812 determines that the core is operating below a target performance level. For example, if a core is drawing current from a power supply rail less than a total current allocated for that core or processor 804, then PCU 810 and/or PMIC 812 can temporarily increase the power draw for that core or processor 804 (e.g., by increasing clock frequency and/or power supply voltage level) so that the core or processor 804 can perform at higher performance level. As such, voltage and/or frequency can be increased temporarily for processor 804 without violating product reliability.

In an example, PCU 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 810 and/or PMIC 812 in at least one embodiment to allow PCU 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, OS 852, one or more Power Management (PM) specific application programs (e.g., generically referred to as PM applications 858), and/or the like. PM applications 858 may also be executed by the PCU 810 and/or PMIC 812. OS 852 may also include one or more PM applications 856a, 856b, 856c. The OS 852 may also include various drivers 854a, 854b, 854c, etc., some of which may be specific for power management purposes. In some embodiments, device 800 may further comprise a Basic Input/Output System (BIOS) 820. BIOS 820 may communicate with OS 852 (e.g., via one or more drivers 854), communicate with processors 804, etc.

For example, one or more of PM applications 858, 856, drivers 854, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

In some embodiments, multiple tasks are variously performed each with a respective one of application programs 850 and/or OS 852. At a given time during operation of computing device 800, at least some of the tasks each result in, or otherwise correspond to, a respective input being received via one or more human interface devices (HIDs). Said tasks each further include or otherwise correspond to a different respective data flow by which computing device 800 communicates with one or more networks (e.g., via connectivity circuitries 831). User input and/or other characteristics of user behavior are detected with the one or more HIDs, and provide a basis for detecting a relative interest by the user in one task over one or more other copending tasks. By way of illustration and not limitation, OS 852 provides a kernel space in which QoS logic, a filter driver, and/or other suitable software logic executes to detect a task which is currently of relatively greater user interest, and to prioritize a data flow which corresponds to said task. An indication of the relative prioritization of tasks (e.g., and the relative prioritization of corresponding data flows) is communicated, for example, from processor 804 to connectivity circuitries 831. Based on such signaling, connectivity circuitries 831 variously processes data packets according to the prioritization of tasks relative to each other.

In accordance with some embodiments, the PMIC 812 and/or a PCU (e.g., such as PCU 810a inside the core 808a, or such as the PCU 810b outside the processor 804) is further configured with ANPTAS technology as described herein to provides schedule recommendations to an OS scheduler of the OS 852 based on a physical layout design of the blocks of the SOC 801 (e.g., the cores 808, the cache 806, the VR(s) 814, the memory interface 834, etc.). In some embodiments, thermal telemetry data may be provided to the suitably configured PCU/PMIC, and the PCU/PMIC provides the schedule information to the OS scheduler (e.g., or to a HGS that provides the schedule information to the OS scheduler).

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU;

3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 11A, 11B:
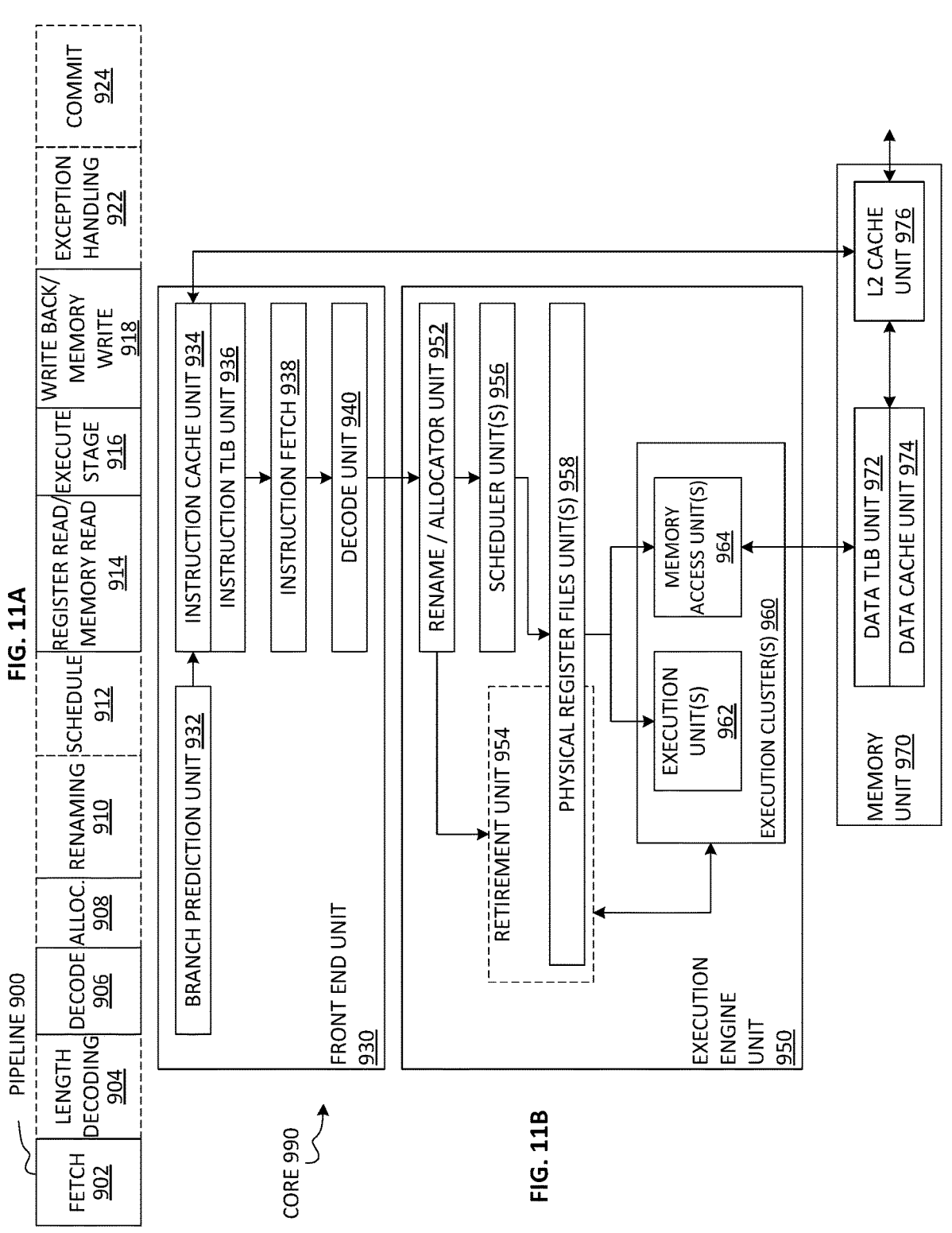
FIG. 11A is a block diagram illustrating both an exemplary in-order pipeline and an exemplary register renaming, out-of-order issue/execution pipeline according to embodiments of the invention.
FIG. 11B is a block diagram illustrating both an exemplary embodiment of an in-order architecture core and an exemplary register renaming, out-of-order issue/execution architecture core to be included in a processor according to embodiments of the invention.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 11B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s)

956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch unit 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12A:
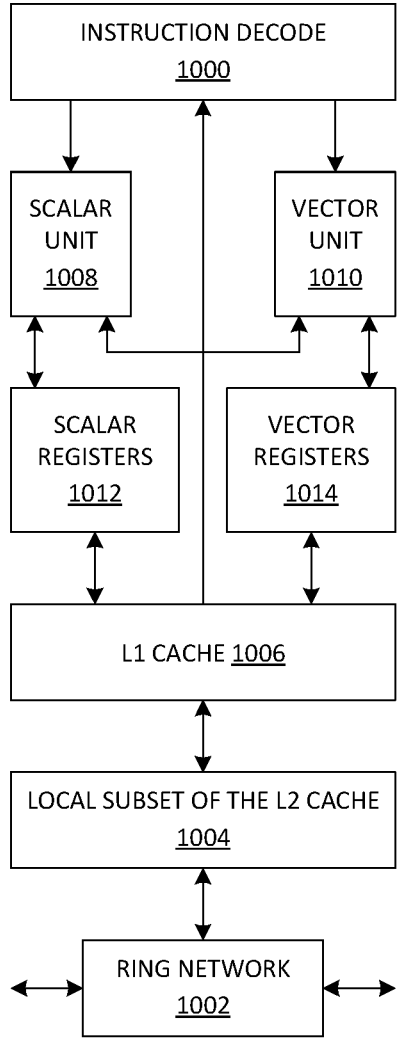
FIGS. 12A-B illustrate a block diagram of a more specific exemplary in-order core architecture, which core would be one of several logic blocks (including other cores of the same type and/or different types) in a chip.
Figure 12B:
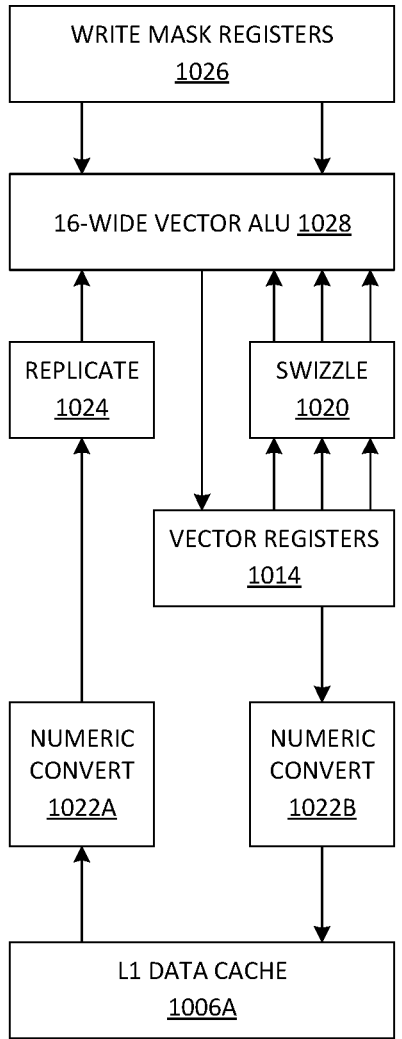

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 13:
FIG. 13 is a block diagram of a processor that may have more than one core, may have an integrated memory controller, and may have integrated graphics according to embodiments of the invention.
Figure 13:
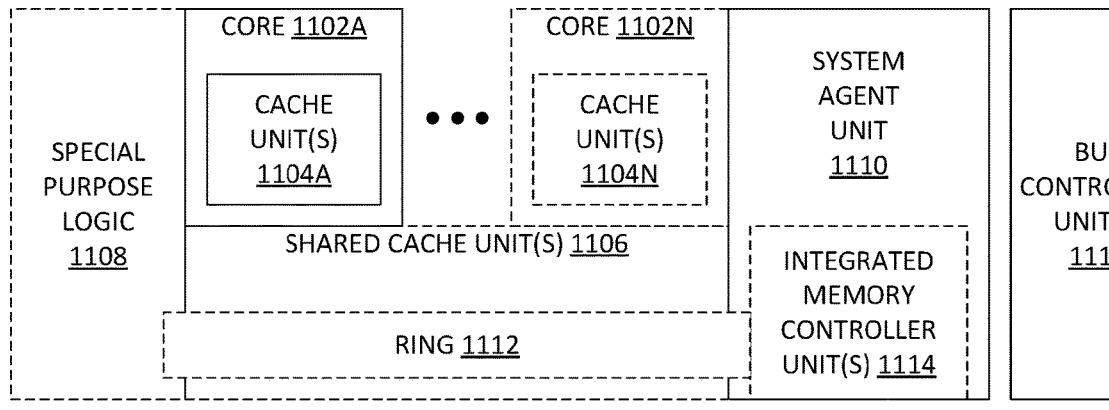

FIG. 13 is a block diagram of a processor 1100 that may have more than one core, may have an integrated memory controller, and may have integrated graphics according to embodiments of the invention. The solid lined boxes in FIG. 13 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
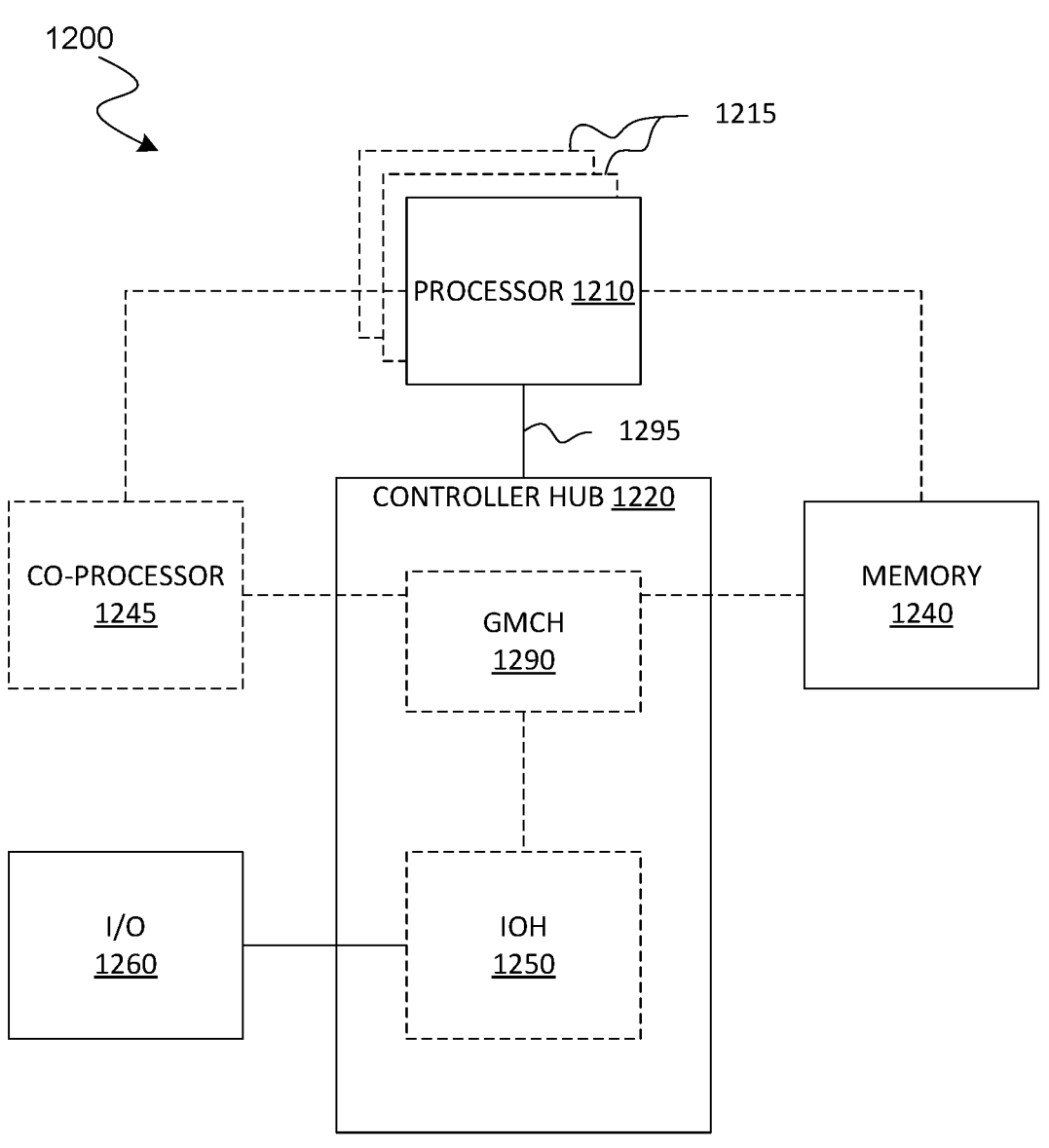

Referring now to FIG. 14, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 14 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources of the processors 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 15:
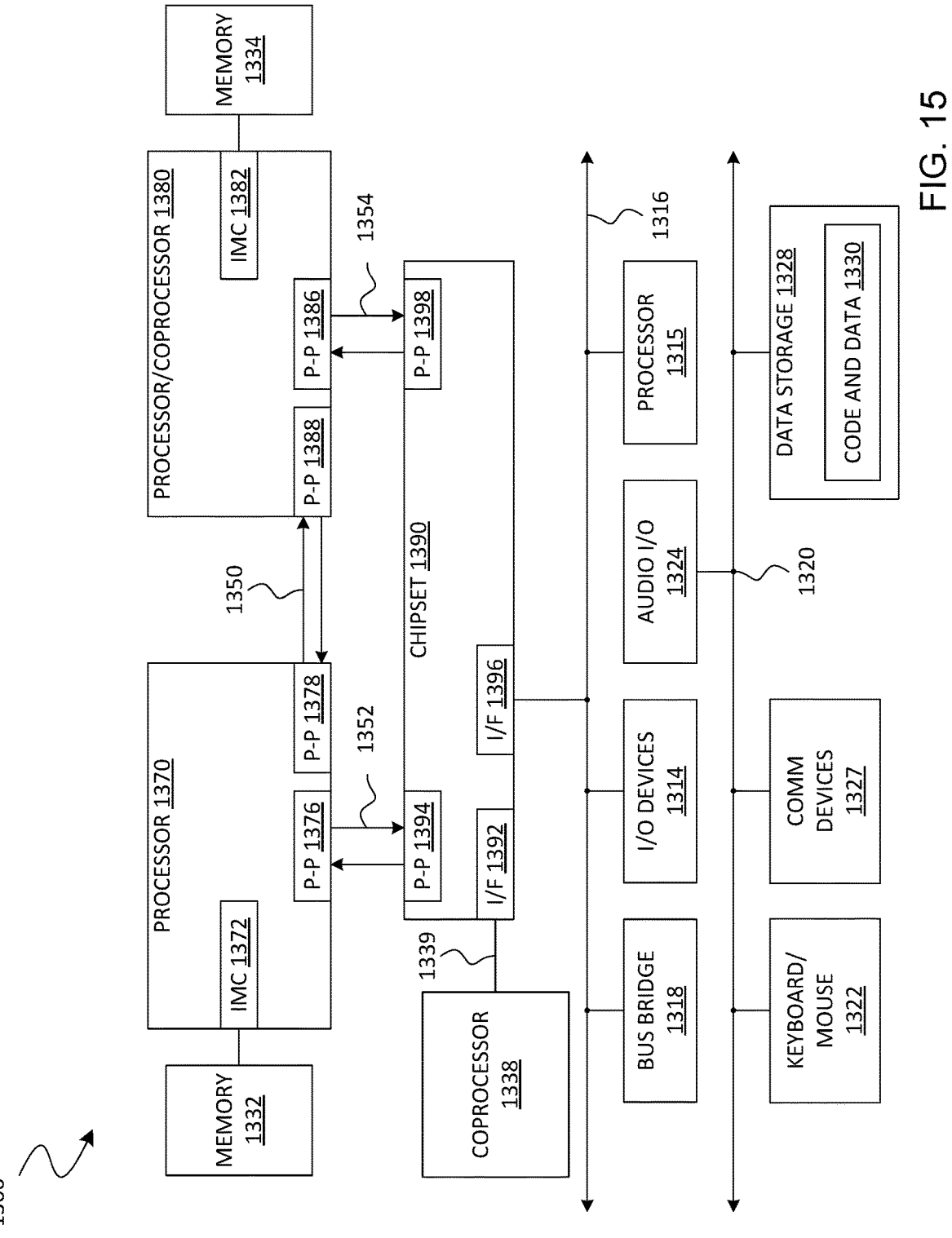

Referring now to FIG. 15, shown is a block diagram of a first more specific exemplary system 1300 in accordance with an embodiment of the present invention. As shown in FIG. 15, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 15, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 15, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 15, a system may implement a multi-drop bus or other such architecture.

Figure 16:
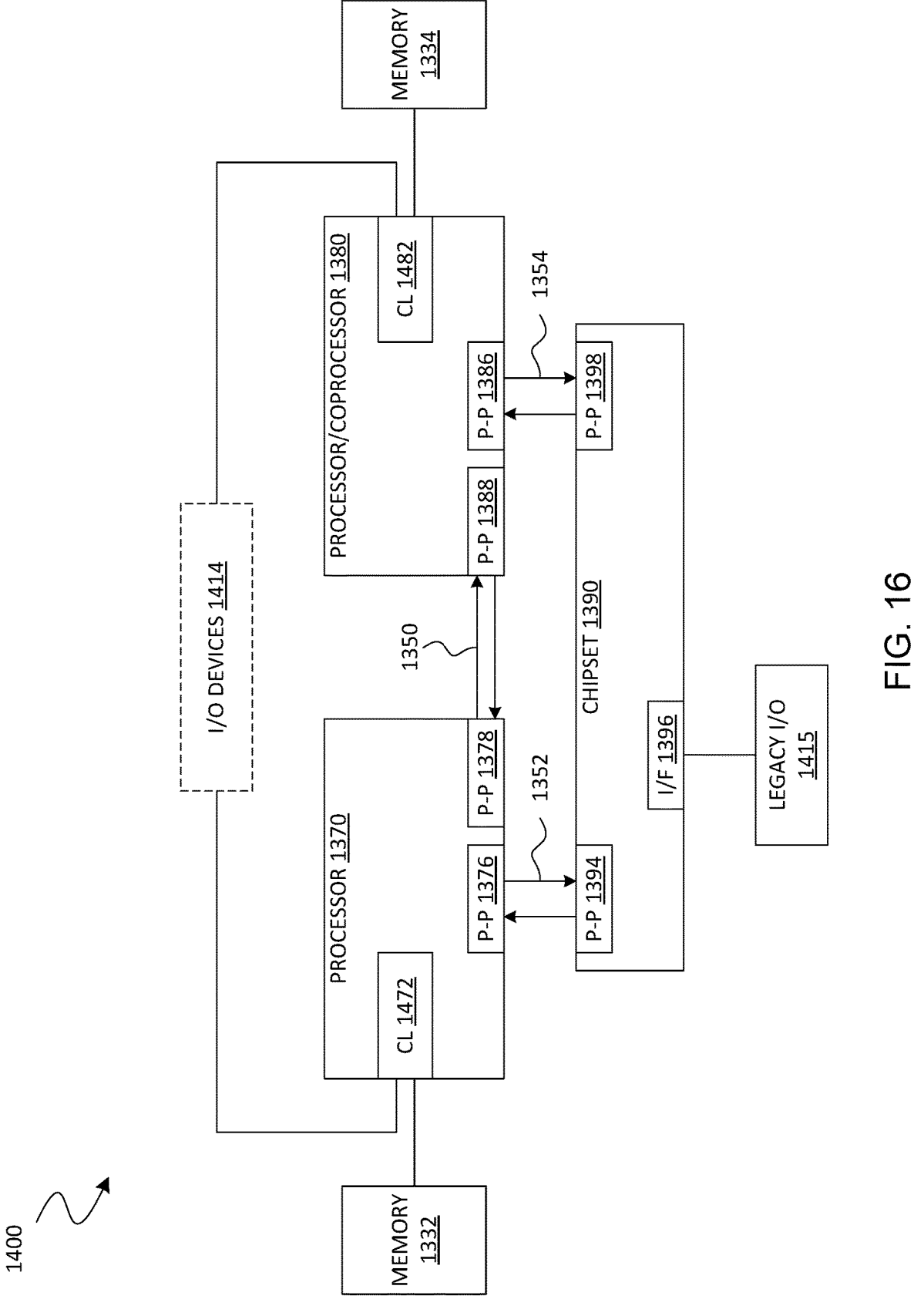

Referring now to FIG. 16, shown is a block diagram of a second more specific exemplary system 1400 in accordance with an embodiment of the present invention Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1370, 1380 may include integrated memory and I/O control logic ("CL") 1472 and 1482, respectively. Thus, the CL 1472, 1482 include integrated memory controller units and include I/O control logic. FIG. 16 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 17, shown is a block diagram of a SOC 1500 in accordance with an embodiment of the present invention. Similar elements in FIG. 13 bear like reference numerals. Also, dashed lined boxes are optional features on more advanced SOCs. In FIG. 17, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 18 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for ANPTAS technology are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an integrated circuit, comprising a management controller, and circuitry communicatively coupled to the management controller, the circuitry to dynamically determine a performance measurement for each of two or more circuit blocks based at least in part on the physical design layout of the two or more circuit blocks, and report a schedule recommendation to an operating system scheduler based at least in part on the determined performance measurements.

Example 2 includes the integrated circuit of Example 1, wherein the circuitry is further to dynamically estimate a thermal sensitivity for each of the two or more circuit blocks based at least in part on the physical design layout of the two or more circuit blocks.

Example 3 includes the integrated circuit of any of Examples 1 to 2, wherein the circuitry is further to dynamically determine a performance measurement for a first circuit block of the two or more circuit blocks based at least in part on an estimated recovery time of the first circuit block.

Example 4 includes the integrated circuit of any of Examples 1 to 3, wherein the circuitry is further to dynamically determine a performance measurement for a first circuit block of the two or more circuit blocks based at least in part on activity on a second circuit block of the two or more circuit blocks.

Example 5 includes the integrated circuit of Example 4, wherein the first circuit block comprises a core block and wherein the second circuit block comprises a non-core block.

Example 6 includes the integrated circuit of any of Examples 1 to 5, wherein the circuitry is further to dynamically determine a thermal efficiency profile for a first circuit block of the two or more circuit blocks based at least in part on respective thermal efficiency profiles of one or more circuit blocks arranged physically proximate to the first circuit block.

Example 7 includes the integrated circuit of any of Examples 1 to 6, wherein the two or more circuit blocks includes two or more cores, and wherein the circuitry is further to determine the schedule recommendation for a recommended combination of cores to be utilized based on a data structure that indicates a combination of the two or more cores that provides a best thermal efficiency.

Example 8 includes the integrated circuit of any of Examples 1 to 7, wherein the circuitry is further to provide the determined performance measurements to a hardware-guided scheduler, and report the schedule recommendation to the operating system scheduler from the hardware-guided scheduler.

Example 9 includes the integrated circuit of any of Examples 1 to 8, wherein the circuitry is further to determine the schedule recommendation based at least in part on the determined performance measurements and in part on an application specific requirement.

Example 10 includes a method, comprising dynamically determining a performance measurement for each of two or more circuit blocks based at least in part on the physical design layout of the two or more circuit blocks, and reporting a schedule recommendation to an operating system scheduler based at least in part on the determined performance measurements.

Example 11 includes the method of Example 10, further comprising dynamically estimating a thermal sensitivity for each of the two or more circuit blocks based at least in part on the physical design layout of the two or more circuit blocks.

Example 12 includes the method of any of Examples 10 to 11, further comprising dynamically determining a performance measurement for a first circuit block of the two or more circuit blocks based at least in part on an estimated recovery time of the first circuit block.

Example 13 includes the method of any of Examples 10 to 12, further comprising dynamically determining a performance measurement for a first circuit block of the two or more circuit blocks based at least in part on activity on a second circuit block of the two or more circuit blocks.

Example 14 includes the method of Example 13, wherein the first circuit block comprises a core block and wherein the second circuit block comprises a non-core block.

Example 15 includes the method of any of Examples 10 to 14, further comprising dynamically determining a thermal efficiency profile for a first circuit block of the two or more circuit blocks based at least in part on respective thermal efficiency profiles of one or more circuit blocks arranged physically proximate to the first circuit block.

Example 16 includes the method of any of Examples 10 to 15, wherein the two or more circuit blocks includes two or more cores, further comprising determining the schedule recommendation for a recommended combination of cores to be scheduled based on a data structure that indicates a combination of the two or more cores that provides a best thermal efficiency.

Example 17 includes the method of any of Examples 10 to 16, further comprising providing the determined performance measurements to a hardware-guided scheduler, and reporting the schedule recommendation to the operating system scheduler from the hardware-guided scheduler.

Example 18 includes the method of any of Examples 10 to 17, further comprising determining the schedule recommendation based at least in part on the determined performance measurements and in part on an application specific requirement.

Example 19 includes an apparatus, comprising two or more circuit blocks arranged on a same substrate in a physical design layout with asymmetric thermal characteristics, a management controller communicatively coupled to the two or more circuit blocks, the management controller including circuitry to dynamically determine a performance measurement for each of the two or more circuit blocks based at least in part on the physical design layout of the two or more circuit blocks, and report a schedule recommendation to an operating system scheduler based at least in part on the determined performance measurements.

Example 20 includes the apparatus of Example 19, wherein the circuitry is further to dynamically estimate a thermal sensitivity for each of the two or more circuit blocks based at least in part on the physical design layout of the two or more circuit blocks.

Example 21 includes the apparatus of any of Examples 19 to 20, wherein the circuitry is further to dynamically determine a performance measurement for a first circuit block of the two or more circuit blocks based at least in part on an estimated recovery time of the first circuit block.

Example 22 includes the apparatus of any of Examples 19 to 21, wherein the circuitry is further to dynamically determine a performance measurement for a first circuit block of the two or more circuit blocks based at least in part on activity on a second circuit block of the two or more circuit blocks.

Example 23 includes the apparatus of Example 22, wherein the first circuit block comprises a core block and wherein the second circuit block comprises a non-core block.

Example 24 includes the apparatus of any of Examples 19 to 23, wherein the circuitry is further to dynamically determine a thermal efficiency profile for a first circuit block of the two or more circuit blocks based at least in part on respective thermal efficiency profiles of one or more circuit blocks arranged physically proximate to the first circuit block.

Example 25 includes the apparatus of any of Examples 19 to 24, wherein the two or more circuit blocks includes two or more cores, and wherein the circuitry is further to determine the schedule recommendation for a recommended combination of cores to be utilized based on a data structure that indicates a combination of the two or more cores that provides a best thermal efficiency.

Example 26 includes the apparatus of any of Examples 19 to 25, wherein the circuitry is further to provide the determined performance measurements to a hardware-guided scheduler, and report the schedule recommendation to the operating system scheduler from the hardware-guided scheduler.

Example 27 includes the apparatus of any of Examples 19 to 26, wherein the circuitry is further to determine the schedule recommendation based at least in part on the determined performance measurements and in part on an application specific requirement.

Example 28 includes an apparatus, comprising means for dynamically determining a performance measurement for each of two or more circuit blocks based at least in part on the physical design layout of the two or more circuit blocks, and means for reporting a schedule recommendation to an operating system scheduler based at least in part on the determined performance measurements.

Example 29 includes the apparatus of Example 28, further comprising means for dynamically estimating a thermal sensitivity for each of the two or more circuit blocks based at least in part on the physical design layout of the two or more circuit blocks.

Example 30 includes the apparatus of any of Examples 28 to 29, further comprising means for dynamically determining a performance measurement for a first circuit block of the two or more circuit blocks based at least in part on an estimated recovery time of the first circuit block.

Example 31 includes the apparatus of any of Examples 28 to 30, further comprising means for dynamically determining a performance measurement for a first circuit block of the two or more circuit blocks based at least in part on activity on a second circuit block of the two or more circuit blocks.

Example 32 includes the apparatus of Example 31, wherein the first circuit block comprises a core block and wherein the second circuit block comprises a non-core block.

Example 33 includes the apparatus of any of Examples 28 to 32, further comprising means for dynamically determining a thermal efficiency profile for a first circuit block of the two or more circuit blocks based at least in part on respective thermal efficiency profiles of one or more circuit blocks arranged physically proximate to the first circuit block.

Example 34 includes the apparatus of any of Examples 28 to 33, wherein the two or more circuit blocks includes two or more cores, further comprising means for determining the schedule recommendation for a recommended combination of cores to be scheduled based on a data structure that indicates a combination of the two or more cores that provides a best thermal efficiency.

Example 35 includes the apparatus of any of Examples 28 to 34, further comprising means for providing the determined performance measurements to a hardware-guided scheduler, and means for reporting the schedule recommendation to the operating system scheduler from the hardware-guided scheduler.

Example 36 includes the apparatus of any of Examples 28 to 35, further comprising means for determining the schedule recommendation based at least in part on the determined performance measurements and in part on an application specific requirement.

Example 37 includes at least one non-transitory machine readable medium comprising a plurality of instructions that, in response to being executed on a computing device, cause the computing device to dynamically determine a performance measurement for each of two or more circuit blocks based at least in part on the physical design layout of the two or more circuit blocks, and report a schedule recommendation to an operating system scheduler based at least in part on the determined performance measurements.

Example 38 includes the at least one non-transitory machine readable medium of Example 37, comprising a plurality of further instructions that, in response to being executed on the computing device, cause the computing device to dynamically estimate a thermal sensitivity for each of the two or more circuit blocks based at least in part on the physical design layout of the two or more circuit blocks.

Example 39 includes the at least one non-transitory machine readable medium of any of Examples 37 to 38, comprising a plurality of further instructions that, in response to being executed on the computing device, cause the computing device to dynamically determine a performance measurement for a first circuit block of the two or more circuit blocks based at least in part on an estimated recovery time of the first circuit block.

Example 40 includes the at least one non-transitory machine readable medium of any of Examples 37 to 39, comprising a plurality of further instructions that, in response to being executed on the computing device, cause the computing device to dynamically determine a performance measurement for a first circuit block of the two or more circuit blocks based at least in part on activity on a second circuit block of the two or more circuit blocks.

Example 41 includes the at least one non-transitory machine readable medium of Example 40, wherein the first circuit block comprises a core block and wherein the second circuit block comprises a non-core block.

Example 42 includes the at least one non-transitory machine readable medium of any of Examples 37 to 41, comprising a plurality of further instructions that, in response to being executed on the computing device, cause the computing device to dynamically determining a thermal efficiency profile for a first circuit block of the two or more circuit blocks based at least in part on respective thermal efficiency profiles of one or more circuit blocks arranged physically proximate to the first circuit block.

Example 43 includes the at least one non-transitory machine readable medium of any of Examples 37 to 41, wherein the two or more circuit blocks includes two or more cores, comprising a plurality of further instructions that, in response to being executed on the computing device, cause the computing device to determine the schedule recommendation for a recommended combination of cores to be scheduled based on a data structure that indicates a combination of the two or more cores that provides a best thermal efficiency.

Example 44 includes the at least one non-transitory machine readable medium of any of Examples 37 to 43, comprising a plurality of further instructions that, in response to being executed on the computing device, cause the computing device to provide the determined performance measurements to a hardware-guided scheduler, and report the schedule recommendation to the operating system scheduler from the hardware-guided scheduler.

Example 45 includes the at least one non-transitory machine readable medium of any of Examples 37 to 44, comprising a plurality of further instructions that, in response to being executed on the computing device, cause the computing device to determine the schedule recommendation based at least in part on the determined performance measurements and in part on an application specific requirement.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
a management controller; and
circuitry communicatively coupled to the management controller, the circuitry to:
    dynamically generate a thermal model of multiple circuit blocks of a die based on layout information which identifies respective locations of the multiple circuit blocks, wherein the multiple circuit blocks comprise a first circuit block and one or more other circuit blocks which are proximate to the first circuit block, wherein the circuitry to generate the thermal model comprises the circuitry to:
        calculate one or more thermal efficiency profiles each for a respective circuit block of the one or more other circuit blocks; and
        calculate a first thermal efficiency profile for the first circuit block based on the one or more thermal efficiency profiles, wherein the first thermal efficiency profile identifies a thermal sensitivity of the first circuit block, and wherein the thermal sensitivity is based on the respective locations of the multiple circuit blocks; and
    report a schedule recommendation to an operating system scheduler based at least in part on the thermal model.

2. The integrated circuit of claim 1, wherein the circuitry to dynamically generate the thermal model comprises the circuitry to:
dynamically estimate respective thermal sensitivities for each of the multiple circuit blocks based at least in part on the respective locations of the multiple circuit blocks.

3. The integrated circuit of claim 1, wherein the circuitry to dynamically generate the thermal model comprises the circuitry to:
calculate the first thermal efficiency profile based at least in part on an estimated recovery time of the first circuit block.

4. The integrated circuit of claim 1, wherein the circuitry to dynamically generate the thermal model comprises the circuitry to:
calculate the first thermal efficiency profile of the first circuit block based at least in part on activity on a second circuit block of the multiple circuit blocks.

5. The integrated circuit of claim 1, wherein the circuitry is further to:
determine the schedule recommendation further based at least in part on an application specific requirement.

6. A method, comprising:
dynamically generating a thermal model of multiple circuit blocks of a die based on layout information which identifies respective locations of the multiple circuit blocks, wherein the multiple circuit blocks comprise a first circuit block and one or more other circuit blocks which are proximate to the first circuit block, wherein generating the thermal model comprises:
    calculating one or more thermal efficiency profiles each for a respective circuit block of the one or more other circuit blocks; and
calculating a first thermal efficiency profile for the first circuit block based on the one or more thermal efficiency profiles, wherein the first thermal efficiency profile identifies a thermal sensitivity of the first circuit block, and wherein the thermal sensitivity is based on the respective locations of the multiple circuit blocks; and reporting a schedule recommendation to an operating system scheduler based at least in part on the thermal model.

7. The method of claim 6, wherein dynamically generating the thermal model comprises:

dynamically estimating respective thermal sensitivities for each of the multiple circuit blocks based at least in part on the respective locations of the multiple circuit blocks.

8. The method of claim 6, wherein dynamically generating the thermal model comprises:

calculating the first thermal efficiency profile based at least in part on an estimated recovery time of the first circuit block.

9. The method of claim 6, wherein the schedule recommendation is reported to the operating system scheduler via a hardware-guided scheduler.

10. An apparatus, comprising:

multiple circuit blocks arranged on a same substrate, the multiple circuit blocks comprising a first circuit block and one or more other circuit blocks which are proximate to the first circuit block; and a management controller communicatively coupled to the multiple circuit blocks, the management controller including circuitry to:

dynamically generate a thermal model of the multiple circuit blocks based on layout information which identifies respective locations of the multiple circuit blocks, wherein the circuitry to generate the thermal model comprises the circuitry to:

calculate one or more thermal efficiency profiles each for a respective circuit block of the one or more other circuit blocks; and calculate a first thermal efficiency profile for the first circuit block based on the one or more thermal efficiency profiles, wherein the first thermal efficiency profile identifies a thermal sensitivity of the first circuit block, and wherein the thermal sensitivity is based on the respective locations of the multiple circuit blocks; and report a schedule recommendation to an operating system scheduler based at least in part on the thermal model.

11. The apparatus of claim 10, wherein the circuitry to dynamically generate the thermal model comprises the circuitry to:

dynamically estimate respective thermal sensitivities for each of the multiple circuit blocks based at least in part on the respective locations of the multiple circuit blocks.

12. The apparatus of claim 10, wherein the circuitry to dynamically generate the thermal model comprises the circuitry to:

calculate the first thermal efficiency profile based at least in part on an estimated recovery time of the first circuit block.

13. The apparatus of claim 10, wherein the circuitry to dynamically generate the thermal model comprises the circuitry to:

calculate the first thermal efficiency profile of the first circuit block based at least in part on activity on a second circuit block of the multiple circuit blocks.

14. The apparatus of claim 13, wherein the first circuit block comprises a core block and wherein the second circuit block comprises a non-core block.

15. The apparatus of claim 10, wherein the circuitry is to report the schedule recommendation to the operating system scheduler via a hardware-guided scheduler.

* * * * *